(12) United States Patent
Saberton et al.

(10) Patent No.: US 8,322,700 B2
(45) Date of Patent: Dec. 4, 2012

(54) FLEXIBLE HEADER SYSTEM FOR MACHINING WORKPIECES

(75) Inventors: Mark A. Saberton, Floyds Knobs, IN (US); Paul Receveur, New Albany, IN (US)

(73) Assignee: Flow International Corporation, Kent, WA (US)

( * ) Notice: Subject to any disclaimer, the term of this patent is extended or adjusted under 35 U.S.C. 154(b) by 1043 days.

(21) Appl. No.: 12/324,719

(22) Filed: Nov. 26, 2008

(65) Prior Publication Data

US 2009/0140482 A1 Jun. 4, 2009

Related U.S. Application Data

(60) Provisional application No. 61/005,079, filed on Nov. 30, 2007, provisional application No. 61/067,641, filed on Feb. 29, 2008.

(51) Int. Cl.
*B23Q 3/00* (2006.01)
*B23Q 7/00* (2006.01)
*F16J 15/46* (2006.01)

(52) U.S. Cl. ............ 269/296; 277/583; 29/559

(58) Field of Classification Search ........ 269/21, 269/296, 37, 9
See application file for complete search history.

(56) References Cited

U.S. PATENT DOCUMENTS

| | | | |
|---|---|---|---|
| 4,088,312 A | 5/1978 | Frosch et al. | |
| 4,397,598 A | 8/1983 | Ess et al. | |
| 4,527,783 A | 7/1985 | Collora et al. | 269/21 |
| 4,640,501 A | 2/1987 | Poland | 269/21 |
| 4,656,791 A | 4/1987 | Herrington et al. | 51/410 |
| 4,684,113 A | 8/1987 | Douglas et al. | |
| 4,711,016 A | 12/1987 | Genschow et al. | |
| 4,886,442 A | 12/1989 | McCowin et al. | |
| 5,092,028 A | 3/1992 | Harnden | 29/709 |
| 5,163,793 A * | 11/1992 | Martinez | 409/205 |
| 5,318,005 A | 6/1994 | Mayer | 125/13.01 |
| 5,364,083 A | 11/1994 | Ross et al. | |
| 5,372,357 A | 12/1994 | Blaimschein | |
| 5,395,098 A | 3/1995 | Eickhorst et al. | |
| 5,427,363 A | 6/1995 | Rink et al. | |
| 5,457,868 A * | 10/1995 | Blaimschein | 29/559 |

(Continued)

FOREIGN PATENT DOCUMENTS

DE 3217866 C1 11/1983

(Continued)

OTHER PUBLICATIONS

Torrestool brochure, publicly disclosed at least as early as 2004 (2 pages).

*Primary Examiner* — Lee D Wilson
*Assistant Examiner* — Marc Carlson
(74) *Attorney, Agent, or Firm* — Seed IP Law Group PLLC

(57) ABSTRACT

A manufacturing system includes a configurable positioning apparatus and machining system for processing a workpiece retained by the positioning apparatus. The positioning apparatus has different configurations for retaining different types of workpieces, such as panels, fuselages, airfoil skins, and engine housings. The positioning apparatus includes a first support rail and a second support rail spaced apart from the first support rail. The first and second support rails support a plurality of stackable headers that cooperate to position the workpiece. The headers have adjustable heights along their lengths in order to accommodate the shape of the workpiece.

41 Claims, 19 Drawing Sheets

U.S. PATENT DOCUMENTS

| | | | |
|---|---|---|---|
| 5,546,784 A | 8/1996 | Haas et al. | |
| 5,700,117 A | 12/1997 | Sella | 409/164 |
| 5,722,646 A | 3/1998 | Soderberg et al. | |
| 5,829,151 A | 11/1998 | Collier et al. | |
| 5,897,275 A | 4/1999 | Sella | |
| 5,947,460 A | 9/1999 | Williams | 269/37 |
| 6,000,308 A | 12/1999 | LaFountain et al. | |
| 6,032,348 A | 3/2000 | Haas et al. | 29/434 |
| 6,121,781 A | 9/2000 | Martinez | |
| 6,209,188 B1 | 4/2001 | Soderberg et al. | |
| 6,217,013 B1 | 4/2001 | Foreman | |
| 6,250,619 B1 | 6/2001 | Cook et al. | |
| 6,386,805 B1 | 5/2002 | Suzuki | 409/163 |
| 6,418,602 B2 | 7/2002 | Crocker et al. | 29/281.4 |
| 6,454,333 B2 | 9/2002 | Portal | |
| 6,488,060 B1 | 12/2002 | Giovanni | 144/2.1 |
| 6,607,336 B1 | 8/2003 | Suzuki | 409/163 |
| 6,764,434 B1 * | 7/2004 | Volk | 483/36 |
| 7,584,947 B2 * | 9/2009 | Freeland | 269/296 |
| 7,866,642 B2 * | 1/2011 | McAllister | 269/37 |
| 2002/0050672 A1 | 5/2002 | Moncavage | 269/266 |
| 2003/0037650 A1 | 2/2003 | Knaupp et al. | |
| 2007/0069436 A1 | 3/2007 | Zarske | |
| 2008/0127474 A1 | 6/2008 | McAllister | 29/33 K |
| 2010/0115749 A1 | 5/2010 | Martinez et al. | |

FOREIGN PATENT DOCUMENTS

| | | |
|---|---|---|
| DE | 10230270 A1 | 6/2003 |
| EP | 1110667 A2 | 6/2001 |
| EP | 1591195 A1 | 11/2005 |
| ES | 2155330 B1 | 5/2001 |
| ES | 2258893 A1 | 9/2006 |
| WO | 2005042204 A2 | 5/2005 |

\* cited by examiner

FLEXIBLE HEADER SYSTEM FOR MACHINING WORKPIECES

CROSS-REFERENCES TO RELATED APPLICATIONS

This application claims the benefit under 35 U.S.C. §119 (e) of U.S. Provisional Patent Application No. 61/005,079 filed Nov. 30, 2007 and U.S. Provisional Patent Application No. 61/067,641 filed Feb. 29, 2008. These two provisional applications are incorporated herein by reference in their entireties.

BACKGROUND

1. Technical Field

The present invention relates generally to workpiece positioning apparatuses and, in particular, to positioning apparatuses capable of supporting workpieces being processed, trimmed, drilled, milled, and/or inspected.

2. Description of the Related Art

Manufacturing systems often include a holder and a machining tool for machining a workpiece held by the holder. It may be necessary to machine workpieces (e.g., aircraft panels, fuselages, airfoil skins, engine housings, or other structures) that have complex geometries. Traditional holders often have a set of vertically extendable modules capable of assuming different configurations such that the modules cooperate to support a workpiece. The modules may travel horizontally along rails to different locations underneath a workpiece. Unfortunately, complicated drive apparatuses are used to move these modules along the rails. These complicated drive apparatuses often require significant amounts of user training, frequent maintenance, recalibration, and expensive controllers. Additionally, it may be difficult or impossible to increase or decrease the number of modules mounted on the rails if the drive apparatuses are specifically designed for a fixed number of modules, thereby limiting manufacturing flexibility. Accordingly, these types of manufacturing systems may be unsuitable for machining structures commonly used in many industries, such as the aerospace industry.

Header board fixture apparatuses are often used to support relatively large workpieces, such as aircraft panels. An array of stationary or movable fixed height header boards can be support by a pair of horizontal rails. These types of header board fixture apparatuses may not be suitable for processing workpieces with different geometries, especially large curved workpieces (e.g., a portion of a fuselage) with complex geometries. Accordingly, fixed height header boards may be frequently replaced with header boards having different heights or repeatedly repositioned to process different workpieces resulting in significant maching down time and lost productivity.

BRIEF SUMMARY

A manufacturing system can include a waterjet system or milling system for processing a workpiece retained by a flexible header system. The flexible header system can have different configurations for retaining different types of workpieces, such as panels, fuselages, airfoil skins, engine housings, and other large complex structures. The header system, in some embodiments, includes a first support rail and a second support rail spaced from the first support rail. The first and second support rails support a plurality of stackable headers that cooperate to position the workpiece. The headers have adjustable heights along their lengths in order to accommodate the shape of the workpiece. The header system can hold the workpiece stationary or can move the workpiece between any number of desired positions.

In some embodiments, a system for supporting a workpiece includes a frame and a configurable header. The frame includes a first support rail, a second support rail, and a receiving window between the first support rail and the second support rail. The first support rail has a plurality of discrete first mounting regions spaced apart from one another along a length of the first support rail. The second support rail has a plurality of discrete second mounting regions spaced apart from one another along a length of the second support rail. The first mounting regions and corresponding second mounting regions define a plurality of mounting positions extending transversely between the first support rail and the second support rail. The header is dimensioned to rest on the first and second support rails and to support at least a portion of a workpiece.

The header can include one or more rigid members (e.g., beams), panels of actuators, fixed tools, spacers, or combinations thereof. In some embodiments, a panel of actuators is fixedly coupled to a beam such that free ends of the actuators for contacting a workpiece are movable away from and towards the beam. In some embodiments, the header further includes a first locking mechanism at a first end of the header and a second locking mechanism at a second end of the header opposing the first end. The first and second locking mechanisms are coupleable to a pair of the first and second mounting regions to keep the header at a known mounting position extending between the pair of the first and second mounting regions when the first and second locking mechanisms are in locked configurations. The header is movable with respect to the frame when the first and second locking mechanisms are in unlocked configurations.

In some embodiments, a manufacturing system for processing a workpiece is provided. The manufacturing system includes a stationary frame, a plurality of headers, and a machining assembly, such as a waterjet assembly or milling assembly. The stationary frame has a first support rail and a second support rail. The first support rail includes a plurality of discrete first mounting regions formed therein. The second support rail includes a plurality of discrete second mounting regions formed therein. Corresponding transverse pairs of the first and second mounting regions define installation positions. The plurality of headers are positionable at respective ones of the installation positions. In some embodiments, each of the headers includes a row of movable actuators adapted to support at least a portion of a workpiece. The machining system is adjacent to the stationary frame. The machining system has one or more tools (e.g., a cutting tool, waterjet, nozzle, and the like) that are movable with respect to a workpiece supported by the plurality of headers so as to process the workpiece.

In yet other embodiments, a system for positioning a workpiece includes a first support rail and a second support rail. The first and second support rails define a plurality of discrete mounting positions along axial lengths of the first and second support rails. The system further includes a plurality of elongate upright headers independently movable along the axial lengths of the first and second support rails and fixedly coupleable to the first and second support rails at respective ones of the discrete mounting positions. Each of the headers is adapted to rest on the first and second support rails.

In some embodiments, a method of processing a workpiece is provided. The method includes positioning a plurality of headers adjacent to a plurality of first mounting regions formed in a first rail and a plurality of second mounting regions formed in a second rail such that the plurality of headers extend transversely between the first and second rails. The headers are fixedly coupled to the first and second rails using locking mechanisms of the headers such that each locking mechanism is received by one of the first and second mounting regions. A workpiece is placed on at least some of the actuators of the headers. The workpiece is processed using machining tools. The processed workpiece is then removed from the actuators. The headers are then decoupled from the first and second rails using the locking mechanisms.

In some embodiments, an actuator of a header can be eccentrically positioned with respect to a beam of the header supporting the actuator. In some embodiments, the actuator is moved to various positions along the beam while passing through the beam. For example, the actuator can be moved from a first mounting position to a second mounting position while the actuator extends through an aperture in the beam. The beam supports the actuator in both the first and second mounting positions.

In some embodiments, a header apparatus comprises a main body adapted to receive a plurality of actuators. The main body includes at least one fluid passageway coupleable to the plurality of the actuators carried by the main body. In some embodiments, the main body is an extruded body. The passageway can be an integral passageway formed via an extrusion process.

DETAILED DESCRIPTION

The following description relates to manufacturing systems that include one or more processing systems suitable for trimming, milling, drilling, inspection, cleaning, abrading, and/or otherwise processing workpieces. The manufacturing systems can include a workpiece positioning apparatus and a machining assembly movable with respect to the workpiece positioning apparatus. The machining assembly can be a waterjet assembly, milling assembly, or another type of system for performing the desired processing. One or more workpieces (e.g., panels, fuselages, airfoil skins, engine housings, aircraft components, and the like) can rest on the positioning apparatus that reduces, limits, or substantially prevents unwanted movement of the workpieces while the machining assembly uses a tool to process the workpieces. The positioning apparatus can generally include one or more stackable, upright headers that can be moved away from or towards one another. Each header can independently assume a configuration based on the geometry of the workpiece. For example, a vertically oriented header can have an adjustable and/or a programmable height along its longitudinal length such that the header generally matches the shape of the workpiece. Such headers can include a panel of independently operated movable actuators adapted to support, position (e.g., raise and/or lower), hold, and/or otherwise retain the workpiece.

To assist in the description of the illustrated embodiments, terms such as upward, upper, downward, lower, upright, vertical, and horizontal are used to describe the accompanying figures. It will be appreciated, however, that the illustrated embodiments can be located or oriented in a variety of desired positions, including various angles, sideways, and even upside down.

Unless the context requires otherwise, throughout the specification and claims which follow, the word "comprise" and variations thereof, such as, "comprises" and "comprising" are to be construed in an open, inclusive sense, that is as "including, but not limited to."

Figure 1:
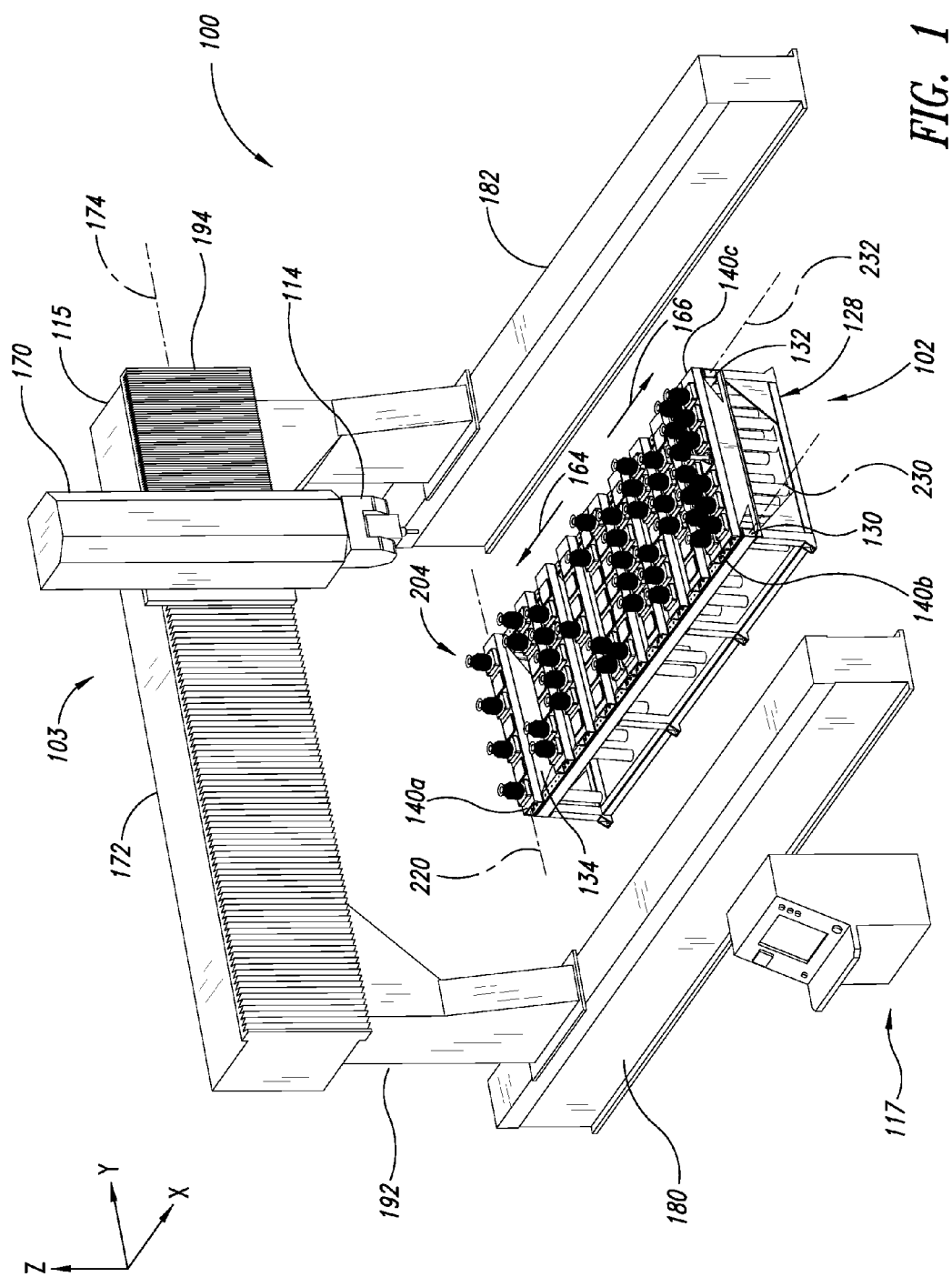
FIG. 1 is an isometric view of a manufacturing system, in accordance with one illustrated embodiment.

FIG. 1 shows a manufacturing system 100 for processing a wide range of different types of workpieces. The manufacturing system 100 includes a workpiece positioning apparatus 102 and a processing system 103, which is moved relative to the positioning apparatus 102 via an actuation system 115. A control system 117 controls the path of travel of a machining assembly 114. The machining assembly 114 includes one or more tools suitable for trimming, cutting, milling, drilling, inspecting, cleaning, abrading, or otherwise processing one or more workpieces (not illustrated in FIG. 1) supported by the positioning apparatus 102. The processing system 103 can be, without limitation, a waterjet system, milling system, or the like. The illustrated processing system 103 is a waterjet system with a nozzle suitable for generating and delivering a waterjet. Various types of known waterjet systems can be incorporated into the manufacturing systems disclosed herein, such as the waterjet system disclosed in U.S. Pat. No. 6,000,308.

The illustrated positioning apparatus 102 of FIG. 1 includes a rigid frame 128 having a first support rail 130, a second support rail 132, and a receiving window 134 between the first and second support rails 130, 132. An array of headers is between outermost headers 140a, 140c. The vertically configurable headers 140a, 140b, 140c (collectively 140) rest on and extend between the first and second support rails 130, 132. The headers 140 can be stacked (e.g., horizontally stacked) along the first and second support rails 130, 132 and have variable heights along their lengths. Such headers 140 can assume an upper profile that is similar to a profile of the surface of a workpiece.

Figure 2:
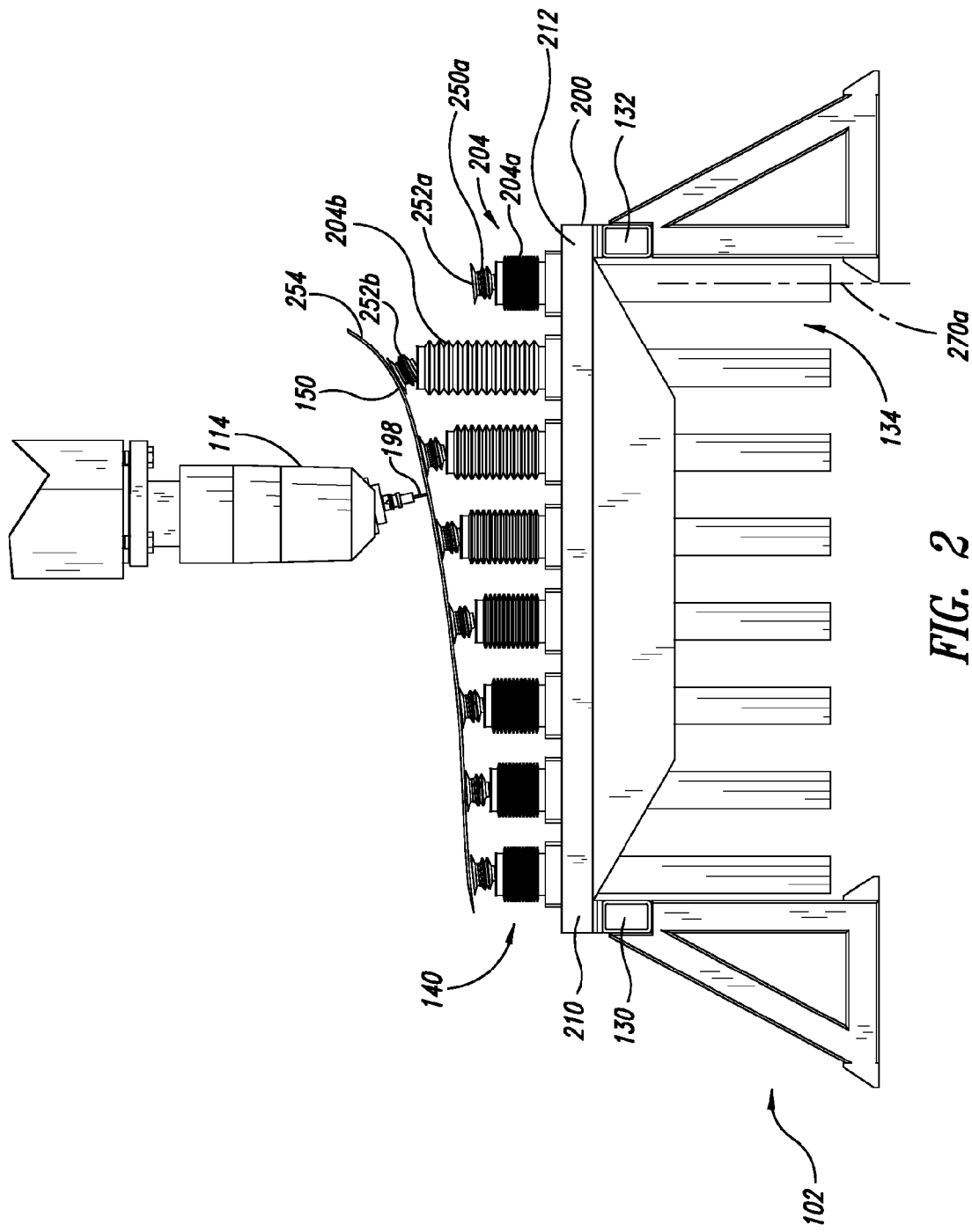
FIG. 2 is a front elevational view of a machining assembly processing a workpiece supported by a vertically configurable header having a panel of actuators, in accordance with one illustrated embodiment.

Each of the headers 140 includes a panel of independently movable actuators that can cooperate to support a workpiece (see FIG. 2). For example, the upper ends of the actuators can be positioned to approximately match the shape of the workpiece. The headers 140 can therefore support and position workpieces having a wide range of geometries. In some embodiments, including the illustrated embodiment of FIG. 1, the headers 140 have panels of closely spaced actuators and are generally vertically upright.

An operator can manually slide any of the headers 140 along the first and second support rails 130, 132 in the directions indicated by arrows 164, 166 to conveniently reconfigure the positioning apparatus 102. The headers 140 can then be fixedly coupled (e.g., locked) to the first and second support rails 130, 132 to set a workpiece on the headers 140.

The illustrated positioning apparatus 102 of FIG. 1 has eleven headers 140. A greater or lesser number of headers can be installed on the first and second support rails 130, 132. For example, additional headers can be installed between the headers 140a, 140b to process a relatively large workpiece. These additional headers can be manually transported and placed on the support rails 130, 132 for rapid installation. This provides more processing flexibility than traditional workpiece holders that have a fixed number of modules for supporting a workpiece. Additionally or alternatively, covers can be placed between the headers 140 as discussed in detail below.

With continued reference to FIG. 1, the actuation system 115 includes a ram 170 for motion along a vertical Z-axis. The ram 170 is slideably coupled to a bridge 172 for motion along a horizontal Y-axis that is generally parallel to a longitudinal axis 174 of the bridge 172. The bridge 172 is mounted on a pair of spaced apart rails 180, 182 such that the bridge 172 may be moved in a direction generally perpendicular to its longitudinal axis 174. For example, the bridge 172 can move along the X-axis that is generally perpendicular to the Y-axis. The machining assembly 114 can thus be moved along the X-axis, Y-axis, and/or Z-axis to process a workpiece on the positioning apparatus 102. Other types of actuation systems employing linear slides, rail systems, carriages, motors, and the like can be used to selectively move and actuate the machining assembly 114 as needed or desired. U.S. Pat. No. 6,000,308 and U.S. Publication No. 2003/0037650 (application Ser. No. 09/940,689), which are both herein incorporated by reference in their entireties, disclose systems, components, and mechanisms that can be incorporated into the manufacturing system 100. For example, the processing head can be used to trim, drill, mill, inspect, clean, abrade, combinations thereof, or otherwise process a workpiece 150 of FIG. 2.

The configurable header 140 of FIG. 2 includes an elongate beam 200 and a panel of upright actuators 204 fixedly coupled to the beam 200. The beam 200 extends between and rests upon the rails 130, 132 such that the panel of actuators 204 is positioned within the receiving window 134. The illustrated beam 200 is positioned generally midway along the panel of actuators 204, which extend through the beam 200.

First and second ends 210, 212 of the beam 200 overlay the support rails 130, 132, respectively. As used herein, the term "beam" is broadly construed to include, without limitation, a generally rigid member or structure capable of being supported at each end. For example, the illustrated beam 200 is a simply supported rigid member that is selectively coupleable to the first and second support rails 130, 132. The beam 200 can be an I-beam, square beam (hollow or solid square beam), rectangular beam (hollow or solid rectangular beam), C-channel beam, or other type of beam having suitable mechanical properties, and can be made, in whole or in part, of one or more metals (e.g., steel, aluminum, or the like), wood, plastics, composite materials, or combinations thereof, as well as other materials with suitable mechanical properties.

The headers 140 can be generally orthogonal to the first and second support rails 130, 132. For example, the header 140a of FIG. 1 has a longitudinal axis 220 that is generally orthogonal to one or both longitudinal axes 230, 232 of the rails 130, 132, respectively. The panel of actuators 204 of the header 140a can also be orthogonal to one or both longitudinal axes 230, 232.

The actuators 204 of FIG. 2 can be generally similar to each other and, accordingly, the following description of one of the actuators applies equally to the others, unless indicated otherwise. The actuators 204 can be mechanical actuators, electric actuators, pneumatic actuators, and/or hydraulic actuators, as well as other types of actuators suitable for engaging a workpiece. For example, the actuators 204 can be servo-controlled linear actuators.

The actuator 204a (illustrated in a fully lowered configuration in FIG. 2) includes a linearly movable workpiece holder 250a having an engagement head 252a for engaging a lower surface of a workpiece. Because the actuator 204a is not beneath the illustrated workpiece 150, it can be kept in the lowered configuration. The actuator 204b (illustrated in a fully raised configuration in FIG. 2) has an engagement head 252b contacting a lower surface 254 of the workpiece 150. Each of the actuators 204 can be moved vertically between a raised configuration and a lowered configuration to support, position, hold, or otherwise engage workpieces.

The lines of action of the actuators 204 can extend through the receiving window 134. For example, the actuator 204a has a line of action 270a along which the workpiece holder 250a translates. The line of action 270a extends through the receiving window 134.

Any number of actuators can be held by the beam 200. The number of actuators can be increased to support a workpiece with highly complex geometry or can be decreased to support a workpiece with a relatively simple geometry. To process a heavy workpiece with a complex geometry (e.g., a highly curved lower surface), headers with a large number of closely spaced actuators can be utilized.

The actuators 204 are fixed to the beam 200 in such a way that the orientations of the actuators 204, even at different heights, can be maintained throughout the entire manufacturing process. The actuators 204 of different headers 140 can also remain generally parallel to each other to ensure that the workpiece 150 remains generally stationary during the manufacturing process, thereby reducing the manufacturing tolerances as compared to traditional systems.

The actuators 204 can be adapted to control side-to-side movement of the workpiece 150. The engagement head 252a of FIG. 2, for example, can be configured to reduce, limit, or substantially prevent side-to-side movement of the workpiece 150. For example, the engagement head 252a can have an outwardly facing adhesive, textured surface, and/or clamp for mating with the lower surface 254 of the workpiece 150. Additionally or alternatively, the engagement head 252a can be adapted to draw a vacuum between itself and the workpiece 150. The vacuum can be sufficient to prevent or limit unwanted side-to-side movement of the workpiece 150. Other types of engagement heads can also be utilized for the desired interaction between the actuators 204 and the workpiece 150. By way of example, the engagement head 252a can include a soft pad for protecting and supporting workpieces.

Figure 3A:
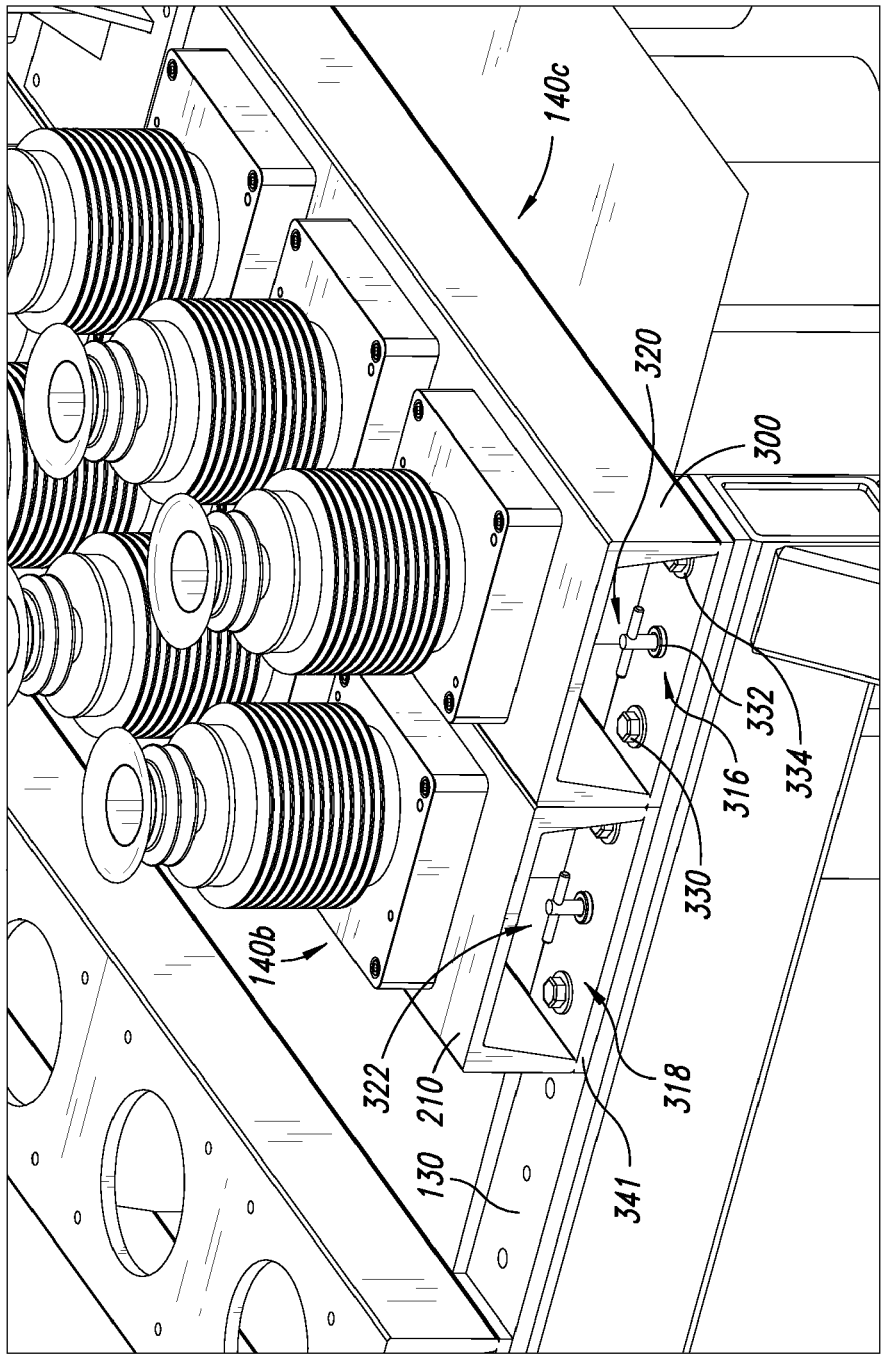
FIG. 3A is an isometric view of a pair of vertically configurable headers mounted on a support rail, in accordance with one illustrated embodiment.

FIG. 3A shows ends 300, 210 of vertically configurable headers 140b, 140c, respectively, attached to the first support rail 130. The end 300 includes a coupling region 316 and a locking mechanism 320 for coupling to the support rail 130. The end 210 includes a coupling region 318 and a locking mechanism 322 for coupling to the support rail 130. The locking mechanisms 320, 322 can be generally similar to each other and, accordingly, the following description of one of the locking mechanisms applies equally to the other, unless indicated otherwise.

Figure 3B:
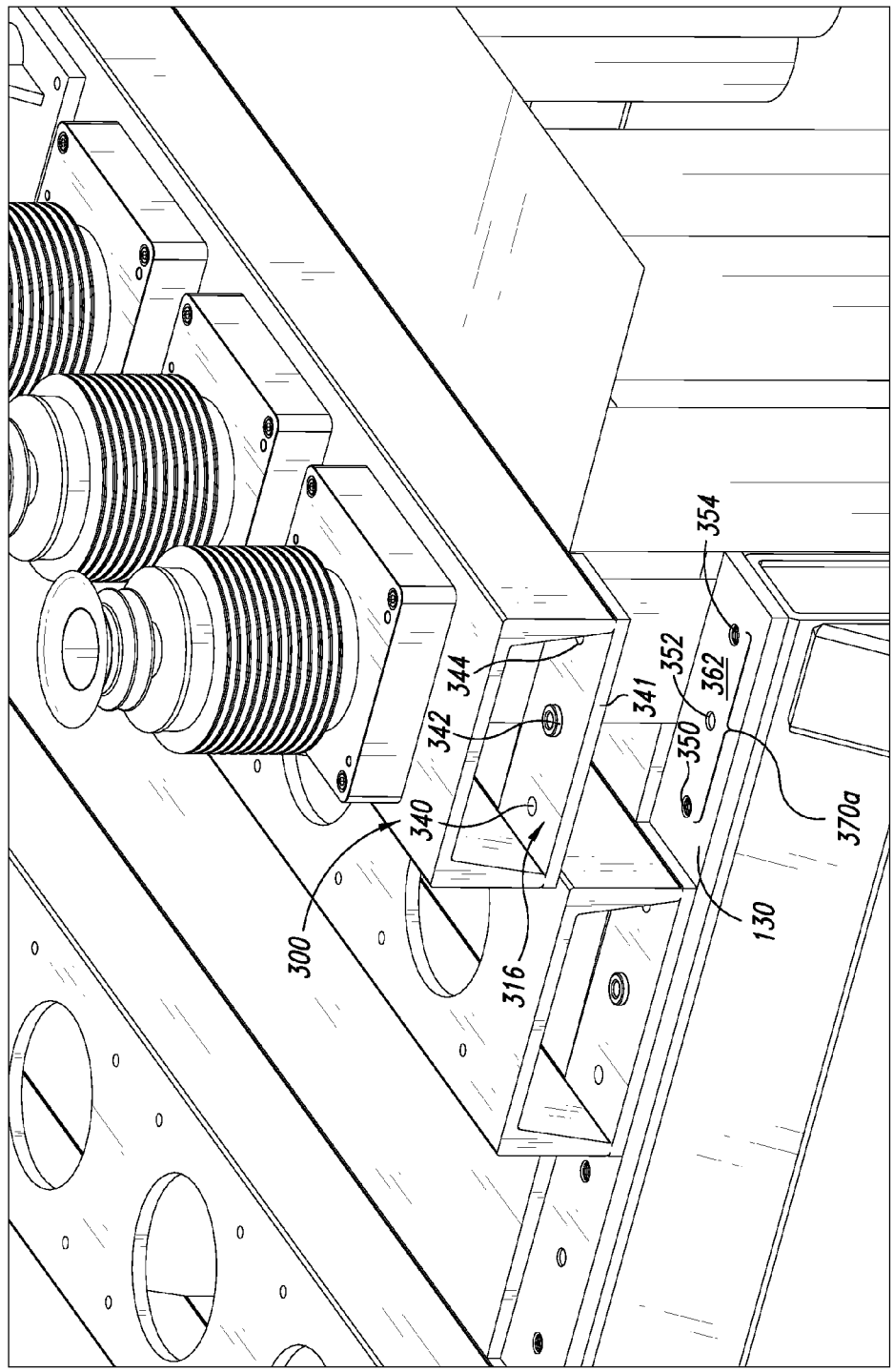
FIG. 3B is an isometric view of one of the vertically configurable headers of FIG. 3A spaced apart from a support rail.

The locking mechanism 320 of FIG. 3A includes a plurality of spaced apart fasteners 330, 332, 334 that extend downwardly through the coupling region 316 (illustrated in the form of openings 340, 342, 344 in FIG. 3B) of a lower portion 341 of the end 300 and through respective openings 350, 352, 354 in the rail 130 (see FIG. 3B). When the end 300 rests on an upper surface 362 of the rail 130, the openings 340, 342, 344 can be vertically aligned with respective openings 350, 352, 354 in the rail 130.

As used herein, the term "fastener" is broadly construed to include, without limitation, one or more members that can fasten two components together. Fasteners include, without limitation, mechanical fastener assemblies (e.g., nut and bolt assemblies), screws, pins (e.g., locating pins), rivets, and the like. For example, the fasteners 330, 334 of FIG. 3A are bolts that extend through respective openings 340, 344 and openings 350, 354. The fastener 332 of FIG. 3A is a vertically movable locating pin.

The locking mechanism 320 can be conveniently installed to fixedly couple the end 300 to the rail 130. For example, the locating pin 332 can be passed through the opening 342 of the lower portion 341 and the opening 352 to position the end 300 with respect to the rail 130. The fasteners 330, 334 are then installed such that the locking mechanism 320 is in a locked configuration. In this manner, the end 300 can be quickly and conveniently attached to the rail 130 without using complicated tooling or equipment.

In some embodiments, the locking mechanism 320 can be in the form of one or more clamps. The clamps can have an open position (e.g., an unlocked configuration) and a closed position (e.g., a locked configuration). When the clamp is in the open position, the end 300 can be freely moved with respect rail 130. The clamps in the closed position can securely grip and fix the rail 130 to the end 300. Other types of locking mechanisms can also be employed.

Figure 4:
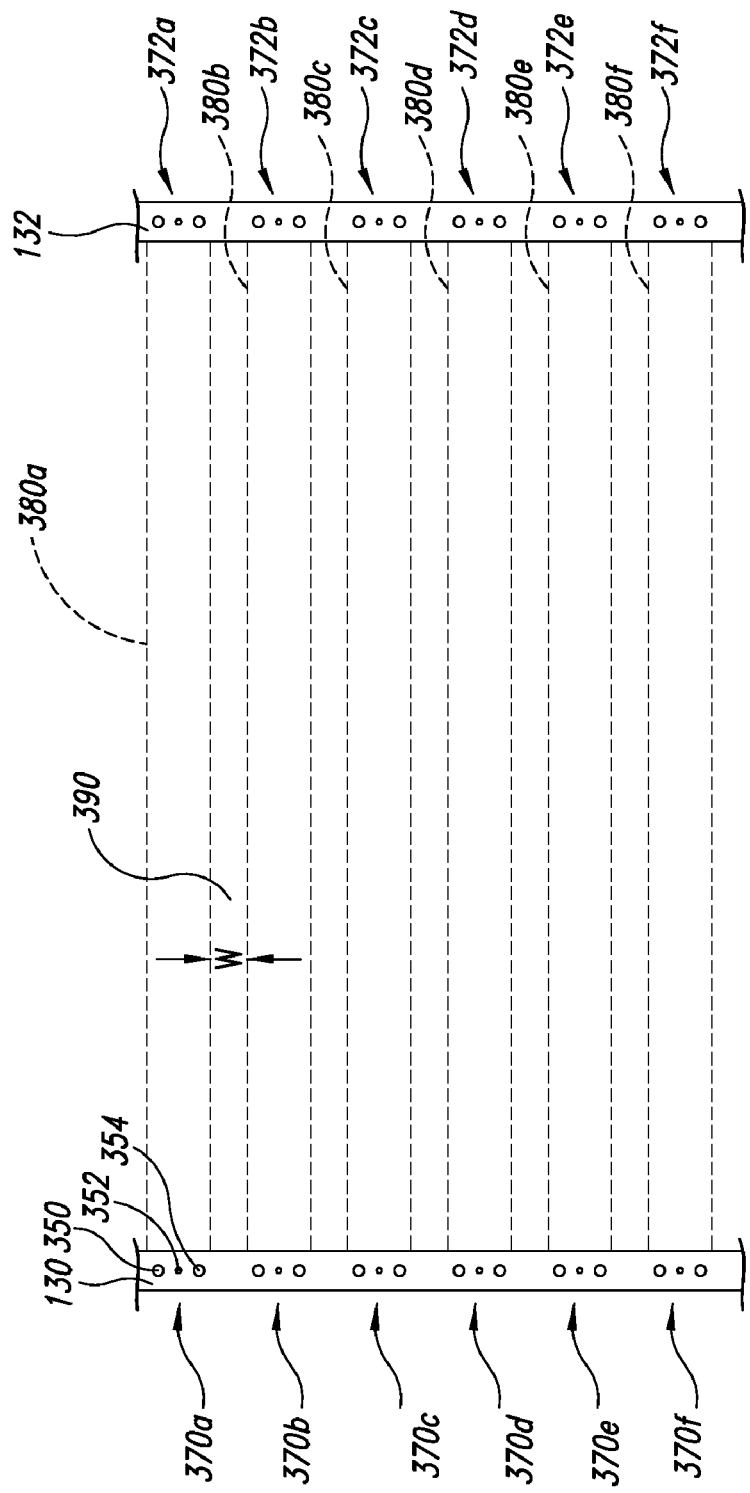
FIG. 4 is a plan view of portions of two support rails, in accordance with one illustrated embodiment.

Referring to FIG. 4, the first and second support rails 130, 132 are generally parallel to one another. The first support rail 130 includes a plurality of discrete mounting regions 370a-f (collectively 370), and the second support rail 132 includes a plurality of discrete mounting regions 372a-f (collectively 372). Corresponding transverse pairs of the mounting regions 370, 372 define mounting positions 380a-f (collectively 380 and illustrated in phantom line) representing transverse mounting positions for headers that are coupled to the respective transverse pairs of the mounting regions 370, 372.

The spacing between the mounting regions 370 and the spacing between the mounting regions 372 can be selected based on the desired pitch of the mounting positions 380. For example, the mounting regions 370, 372 can be evenly or unevenly spaced along the longitudinal lengths of the rails 130, 132, respectively. The illustrated mounting regions 370, 372 are evenly spaced along the longitudinal lengths of the rails 130, 132, respectively.

To install a header at the mounting position 380a, for example, the header can be mated with the mounting regions 370a, 372a. A locking mechanism at one end of the header can mate with the mounting region 370a, and another locking mechanism at the other end of the header can mate with the mounting region 372a. Both locking mechanisms can then be moved to lock configurations to fixedly couple the header to the rails 130, 132. The locking mechanisms can be moved to unlock configurations in order to slide the header along the rails 130, 132. In this manner, headers can be selectively coupled to the rails 130, 132 at any of the positions 380.

The mounting regions 370, 372 can be similar or identical to each other and, accordingly, the following description of one of the mounting regions applies equally to the others, unless indicated otherwise. The mounting region 370a of FIGS. 3B and 4 includes the openings 350, 352, 354 configured to mate with complementary openings 340, 342, 344 of the coupling region 316. In other embodiments, the mounting region 370a can include one or more upwardly extended threaded members (e.g., rods), pins (e.g., movable alignment pins), keying features, or other retaining structures.

With continued reference to FIG. 4, dimensions of the gaps between adjacent positions 380 can be selected based on the desired spacing of the headers. For example, a width W of a gap 390 can be increased or decreased to decrease or increase the number of mounting positions. In some embodiments, the width W is less than the average distance between adjacent actuators of one of the headers. In some embodiments, the width W is equal to or less than 0.1 inch. Other widths W are also possible, especially if sealing devices will be employed. Additionally, the width W can be reduced to provide closely spaced actuators. Thus, the width W can be increased or decreased to increase or decrease the distance between adjacent actuators. Spacers, tooling, stationary supports, and the like can be used to achieve the desired spacing of the actuators.

In some embodiments of using the manufacturing system 100 of FIG. 1, coupling regions of the configurable headers 140 are mated with complementary mounting regions of the rail 130 and mounting regions of the rail 132 such that the headers 140 extend across the rails 130, 132. The headers 140 are then fixed to the rails 130, 132 using their respective locking mechanisms.

The workpiece 150 is then positioned on the actuators 204 of the headers 140. The actuators 204 can be positioned before or after the workpiece 150 is placed thereon. In some embodiments, the actuators 204 are positioned using a program stored in the control system 117 before the workpiece 150 is placed on the actuators 204. After the engagement heads 252 of the actuators 204 are properly positioned, the workpiece 150 is moved over and then placed onto the engagement heads 252. In other embodiments, the workpiece 150 is held above the actuators 204, which are then concurrently or sequentially raised upwardly until the engagement heads 252 under the workpiece 150 contact the lower surface 254 of the workpiece 150. Vertical movement of each engagement heads 252 is stopped once it contacts the workpiece 150.

In this manner, the array of actuators 204 can be positioned based on the geometry of the workpiece 150.

After the headers 140 hold the workpiece 150 at the desired height and orientation, a tool 198 of FIG. 2 (e.g., a rotating tool, waterjet, etc.) is used to perform any number of processes on the workpiece 150. During processing, the headers 140 can keep the workpiece 150 generally stationary to keep the processing within desired tolerances. After processing, the processed workpiece 150 is removed from the headers 140. In some embodiments, another workpiece is then positioned on the headers 140 and processed using the machining assembly 114.

The positioning apparatus 102 can be reconfigured to process different types of workpieces. The locking mechanisms of the respective headers 140 can be moved from a locked configuration to an unlocked configuration to move the respective headers 140. The headers 140 can be slid along the rails 130, 132 in the directions indicated by the arrows 164, 166 to desired mounting positions 380, as discussed in connection with FIG. 4. The headers 140 are then locked to the rails 130, 132.

Figure 5:
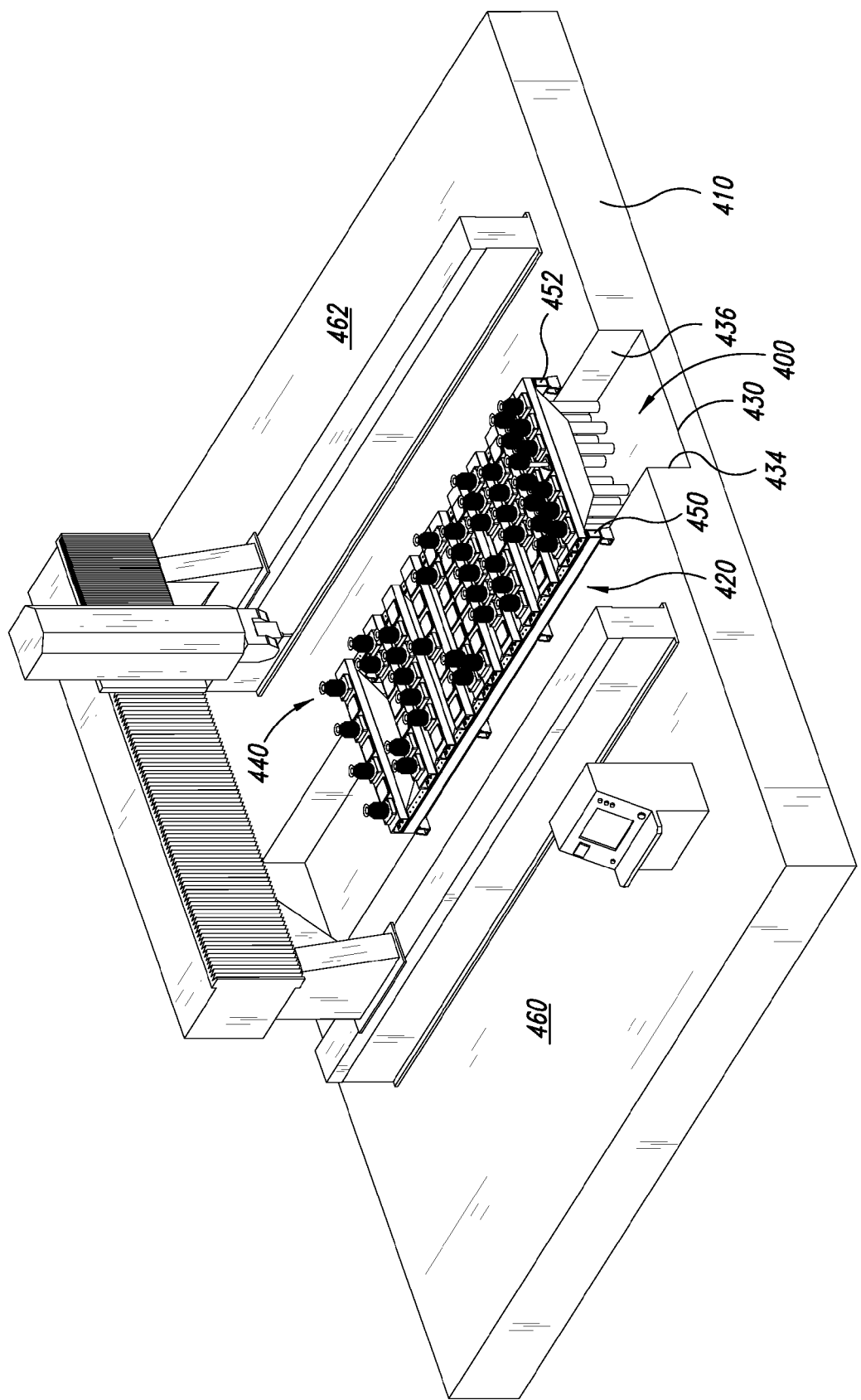
FIG. 5 is an isometric view of a manufacturing system, in accordance with one illustrated embodiment.
Figure 6:
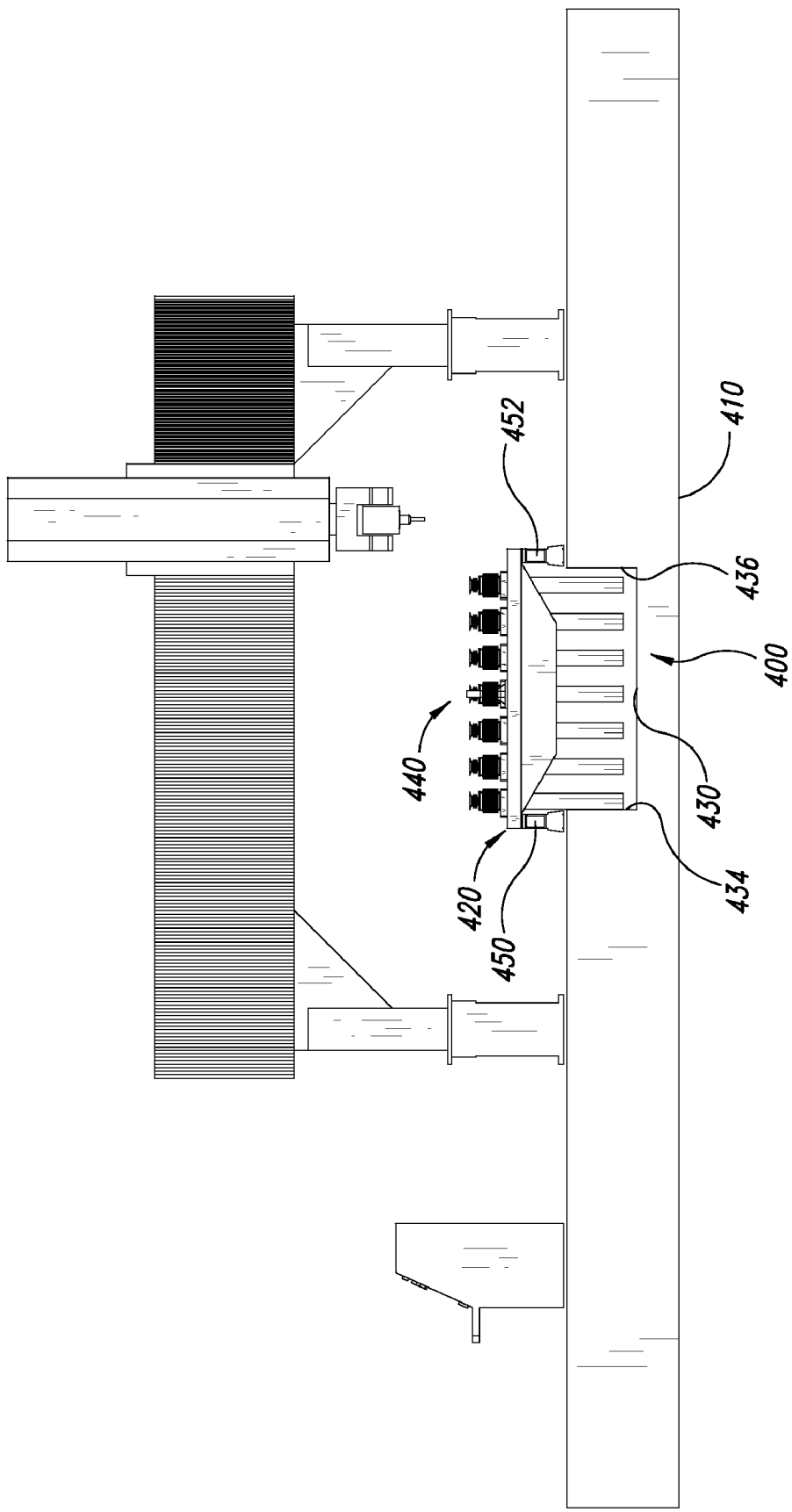
FIG. 6 is a front elevational view of the manufacturing system of FIG. 5.

FIGS. 5 and 6 illustrate a positioning apparatus 400 including a stationary base member 410 and a frame 420 secured to the base member 410. The base member 410 defines a recessed region 430 dimensioned and configured to receive the actuators of an array of headers 440 supported by the frame 420. The illustrated panels of actuators extend transversely across the recessed region 430 such that the outermost actuators in the panels are adjacent to sidewalls 434, 436 of the recessed region 430.

The illustrated recessed region 430 of FIG. 5 is a U-shaped longitudinally-extending channel that closely surrounds the headers 440. The recessed region 430 is generally aligned with the frame 420. The recessed region 430 can have other axial cross-sections, such as a generally V-shaped axial cross-section or other axial cross-section suitable for receiving the headers 440.

The frame 420 includes first and second support rails 450, 452 mounted on respective horizontal upper surfaces 460, 462 of the base member 410. The rails 450, 452 can be permanently or temporarily coupled to the upper surfaces 460, 462 using one or more fasteners. In some embodiments, the rails 450, 452 can be integrated into the base member 410. The recessed region 430 is interposed between and extends downwardly from the upper surfaces 460, 462 so as to form a pit.

Figure 7:
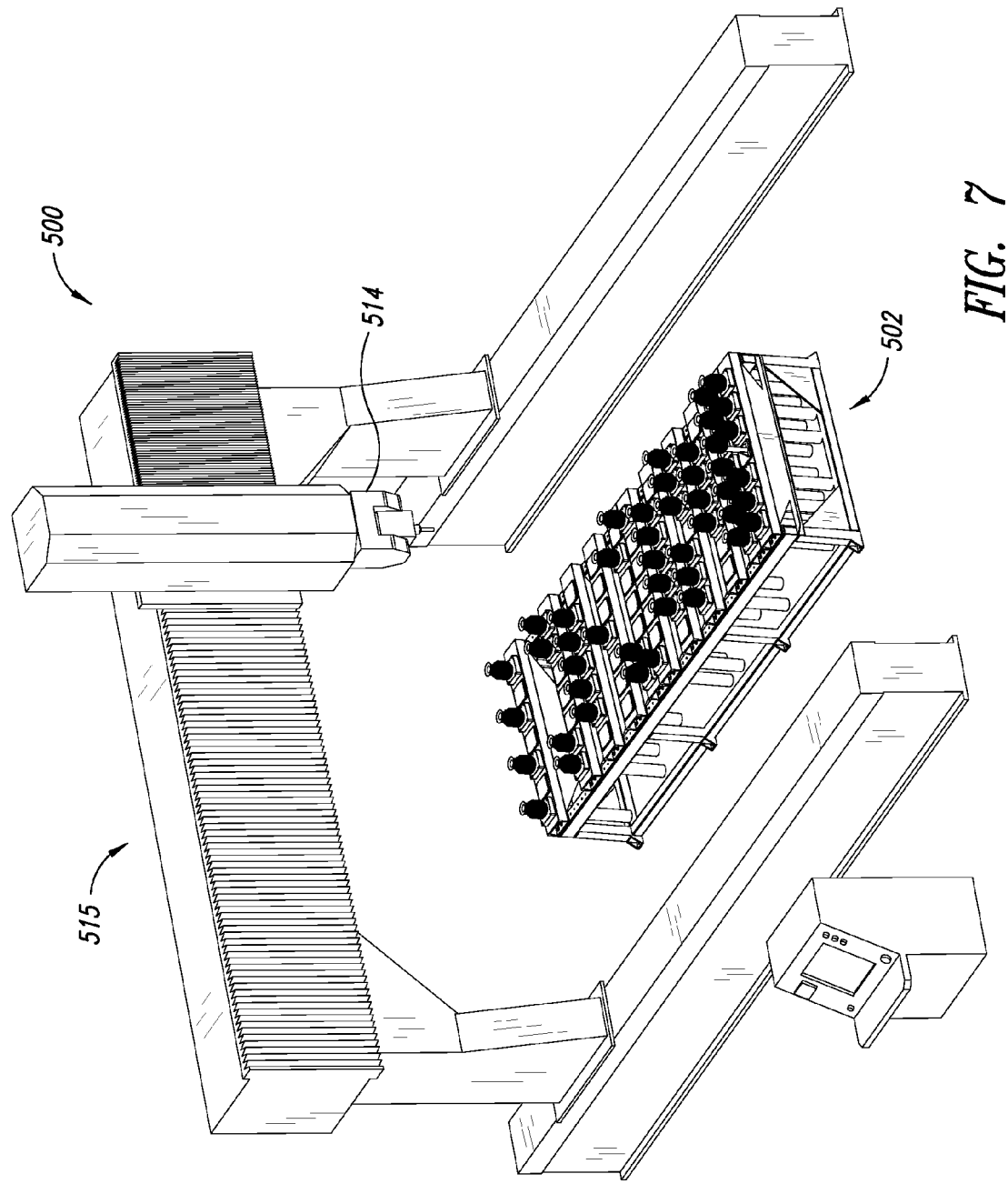
FIG. 7 is an isometric view of a manufacturing system having a modular positioning apparatus, in accordance with one illustrated embodiment.

FIG. 7 shows a manufacturing system 500 including a modular workpiece positioning apparatus 502 movable with respect to a machining assembly 514 of a processing system 515. The positioning apparatus 502 can be portable for convenient installation and removal. Any number of modular workpiece positioning apparatuses 502 can be used to support a single workpiece. For example, two modular workpiece positioning apparatuses 502 can cooperate to support a single workpiece.

Figure 8:
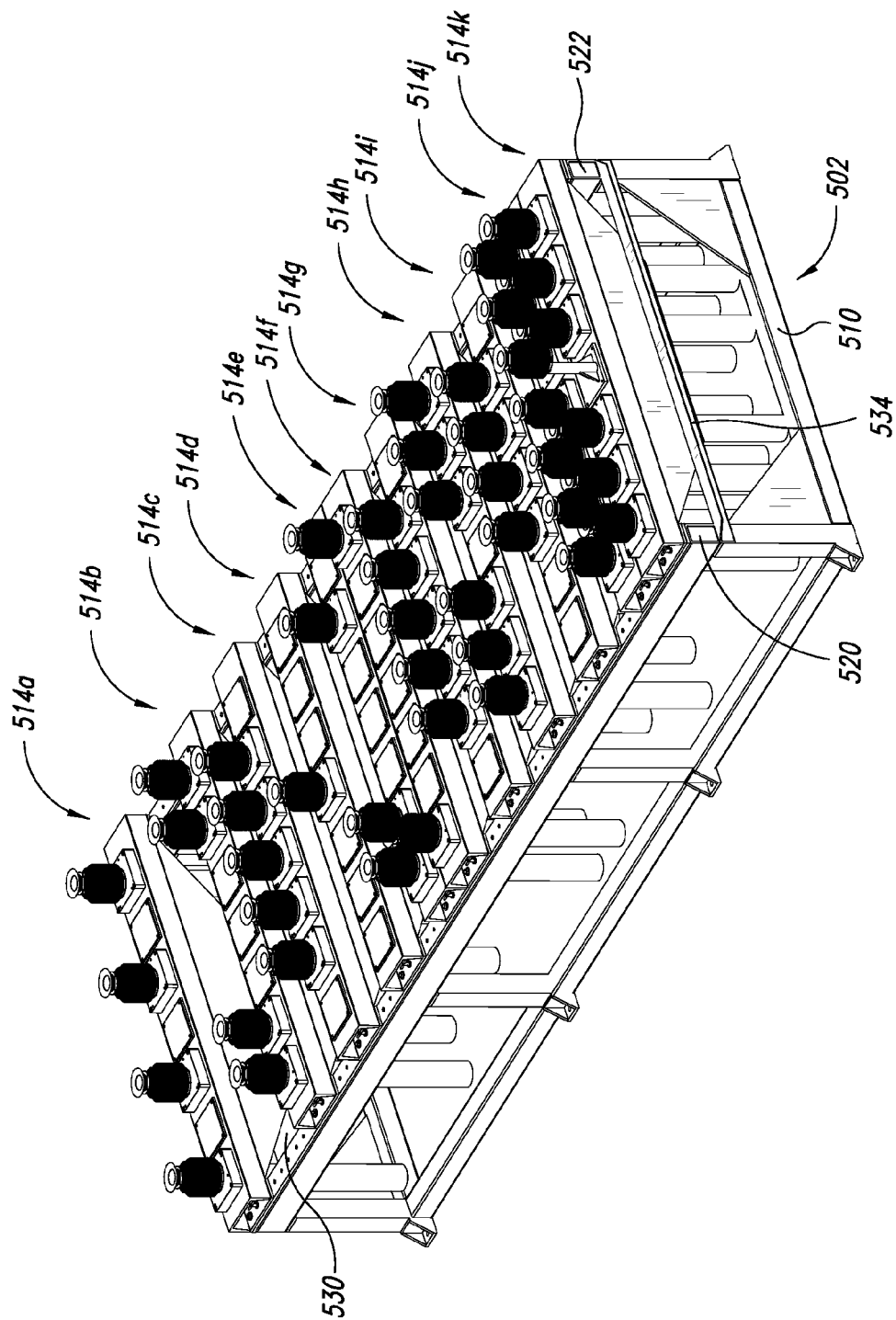
FIG. 8 is an isometric view of a modular workpiece positioning apparatus.

The positioning apparatus 502 of FIGS. 7 and 8 has a rigid frame 510 supporting a plurality of headers 514a-k (collectively 514). The illustrated frame 510 includes a pair of support rails 520, 522 supporting the headers 514 and horizontal transverse members 534 (rear transverse member is hidden in FIGS. 7 and 8) extending between the rails 520, 522. The rails 520, 522 and the transverse members 534 define a receiving window 530 sized to receive the headers 514. Four vertical legs of the frame 510 can support the rails 520, 522 and the transverse members 534, 536.

To install the headers 514, the headers 514 are inserted into and passed through the receiving window 530 until opposing outwardly extending ends of the headers 514 mate with mounting regions of the rails 520, 522. To remove the headers 514, the headers 514 can be lifted vertically away from the rails 520, 522 until the headers 514 are pulled out of the window 530. In this manner, the headers 514 can be conveniently removed from the frame 510 without utilizing complicated tooling or equipment.

The modular positioning apparatus 502 can support workpieces having wide range of dimensions by adding or removing headers based on the dimensions of the workpieces. One or more operators can install, remove, and positioning apparatuses disclosed herein.

Figure 9:
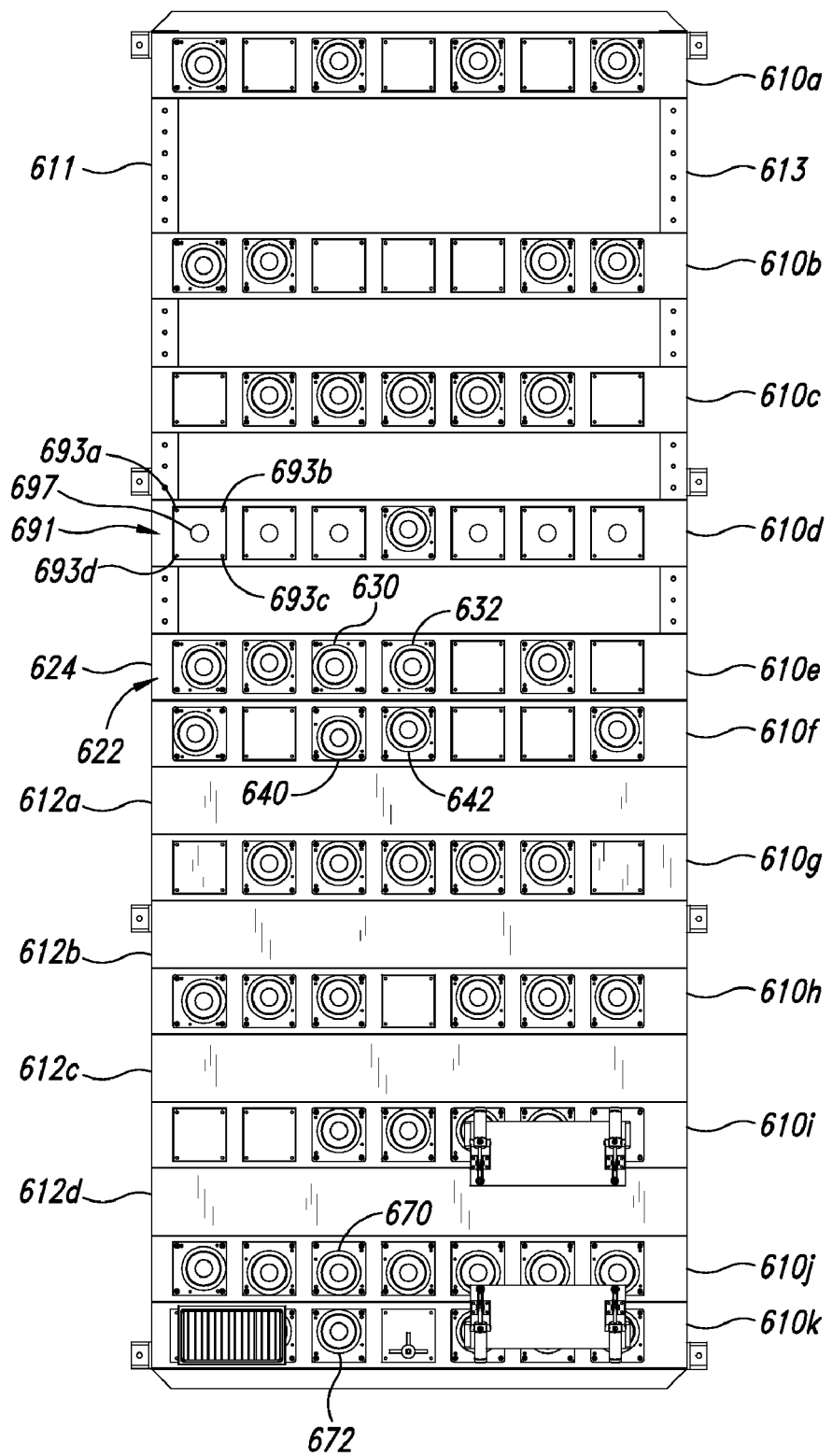
FIG. 9 is a top plan view of a positioning apparatus having actuators, stationary fixation devices, and covers, in accordance with one illustrated embodiment.

FIG. 9 shows a positioning apparatus 600 that includes a plurality of headers 610a-k (collectively 610) and covers 612a-d (collectively 612) supported by rails 611, 613. The covers 612 can be sufficiently wide to define walkways for walking across the positioning apparatus 600 and are discussed in connection with FIG. 13. The headers 610 can be generally similar to each other and, accordingly, the following description of one of the headers applies equally to the others, unless indicated otherwise.

The header 610e includes a panel of actuators 622 movable respect to one another. The relative positions between the actuators can be adjusted. Each actuator of the panel 622 can have a plurality of different installation positions with respect to an elongate beam 624, thereby providing relatively fine spacing adjustments.

The distances between (e.g., actuators of adjacent headers or the same header) can be increased or decreased to achieve the desired spatial relationship between the actuators. The actuators 670, 672 of the headers 610j, 610k are positioned next to each other and the actuators 630, 632 of the header 610e are spaced apart from one another. The actuators can also be positioned to reduce, limit, or substantially prevent twisting of the elongate beams during use. The actuators of the headers can be located along or spaced from the centerline of the respective header to control moments, if any, applied to the beams of the headers. Because both the spacing of the actuators and the spacing of the headers can be varied, a wide range of configurations can be achieved.

Figure 10:
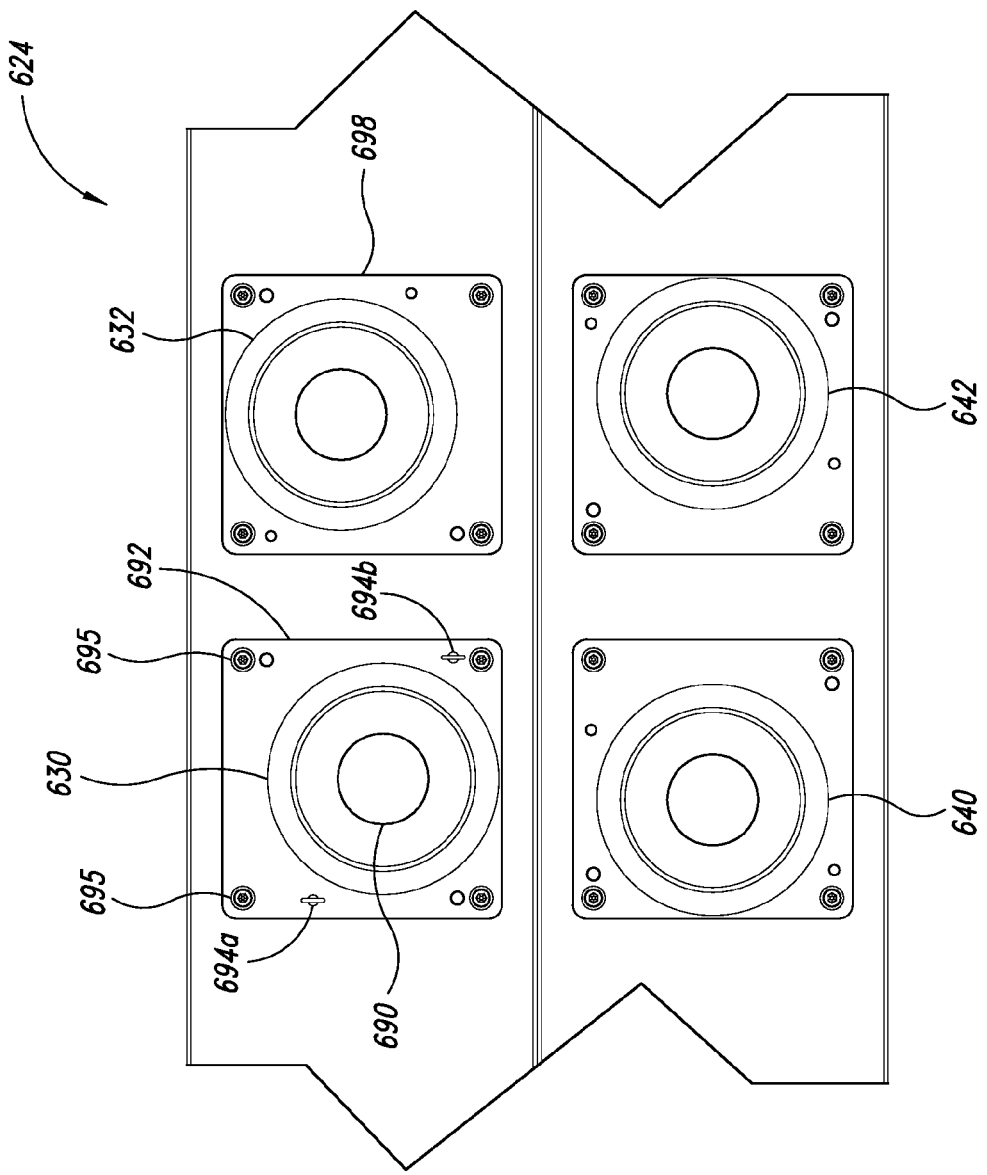
FIG. 10 is a top plan view of four actuators of the positioning apparatus of FIG. 9.

FIG. 10 shows the actuators 630, 632, 640, 642 in another arrangement. The description of one of the actuators applies equally to the others, unless indicated otherwise. The actuator 630 has a movable piston 690 eccentrically positioned with respect to a mounting plate 692, as viewed from above. The piston 690 can be mounted at different positions by changing the orientation of the mounting plate 692. The actuators can be rotated in increments (e.g., 90 degree increments) to preset mounting positions. Each of the actuators can be located at four different locations. For example, the actuator 632 of FIG. 9 can be rotated 90 degrees counterclockwise to the position illustrated in FIG. 10, thus allowing re-positioning, even side-to-side re-positioning by rotating the mounting plate 698. The mounting plate 698 can be replaced with another mounting plate that centers the actuator 632 with respect to the beam 624.

The mounting plate 692 of FIG. 10 can be coupled to a mounting region (e.g., a base plate) of the elongate beam 624. The header 610d, illustrated with only one actuator in FIG. 9, includes a row of flat mounting regions 691, each having corner holes 693a, 693b, 693c, 693d (collectively 693) positioned to mate with corresponding holes of actuator mounting plates. The corner holes 693 surround a central hole through which an actuator can extend. The actuator 630 illustrated in FIGS. 9 and 10 can be installed at a mounting region by passing the fasteners 694a, 694b through mounting plate holes (or other holes) to temporarily couple the mounting plate 692 to the underlying mounting region. In some embodiments, the actuator can be inserted and passed through an opening 697 of the header 610d. The actuator is then rotated to mate the mounting plate to the mounting region 691. A user can manually move the actuator between different eccentric positions while the actuator extends through the opening 697. Many of the other openings of headers are covered with square plates.

Figure 11:
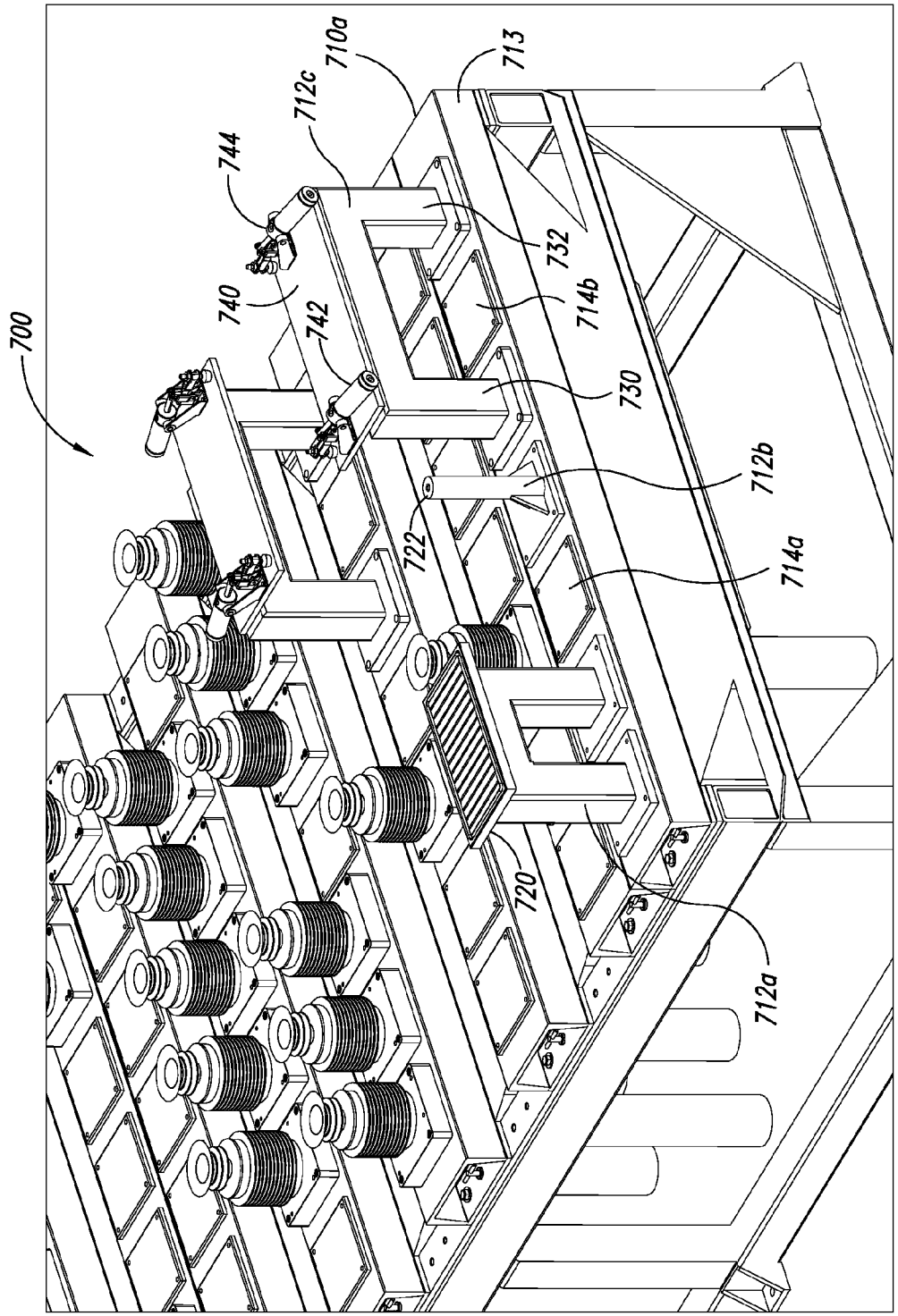
FIG. 11 is an isometric view of a positioning apparatus having actuators and stationary holders, in accordance with one illustrated embodiment.

FIG. 11 illustrates a positioning apparatus 700 that includes headers having both actuators and stationary holders. A header 710a includes a plurality of stationary holders 712a, 712b, 712c and a plurality of hole covers 714a, 714b. The stationary holder 712a is in the form of an upwardly extending arch having a platform 720 for supporting a workpiece. The platform 720 is at a fixed height with respect to an elongate beam 713 of the header 710a. The stationary holder 712b is a workpiece support with an upwardly extending elongate rod that terminates at a free end 722. The stationary support 712c includes an arch having a pair of spaced apart vertically extending legs 730, 732 and a platform 740, which includes a plurality of couplers 742, 744. The couplers 742, 744 can be temporarily or permanently coupled to tooling, features of the workpiece, and the like. Various combinations of movable and stationary components can be mixed and matched. The stationary components may provide reference positions used to position the workpiece. The stationary holders can be removed and reinstalled any number of times to reconfigure the positioning apparatus 700.

To provide gaps between adjacent components, hole covers can be installed in the headers. The header 710a has the cover 714a between the stationary support 712a and the support 712b, while the cover 714b is between the legs 730, 732 of the support 712c. Covers can be positioned below sections of the workpiece not suitable contacting hard tooling.

Figure 12:
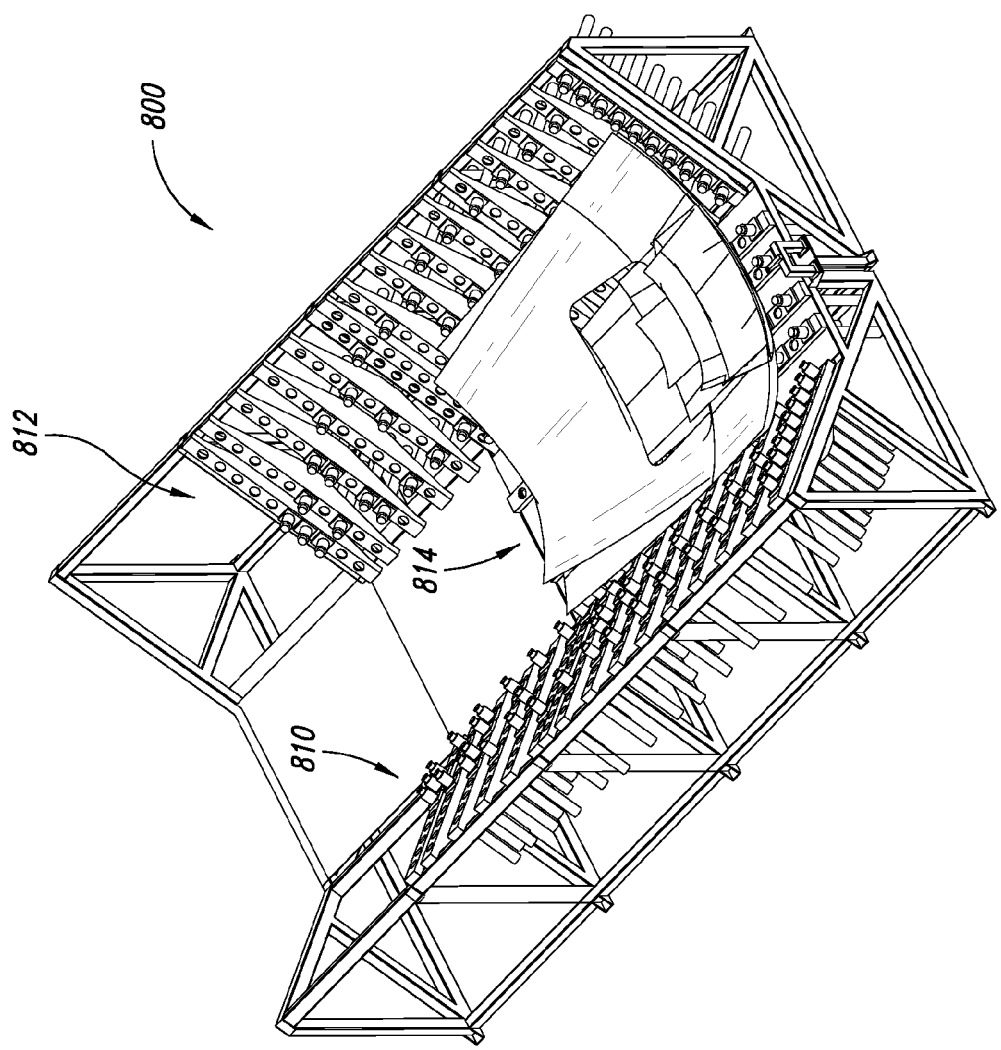
FIG. 12 is an isometric view of a positioning apparatus supporting a section of a fuselage, in accordance with one illustrated embodiment.

Referring to FIG. 12, a positioning apparatus 800 includes a pair of angled positioning assemblies 810, 812 and a central positioning assembly 814 therebetween. The illustrated system 800 is supporting a section of a fuselage having curved shape. The number and relative positions of the positioning assemblies can be selected based on the sized, configuration, properties (e.g., strength) of the workpiece.

Figure 13:
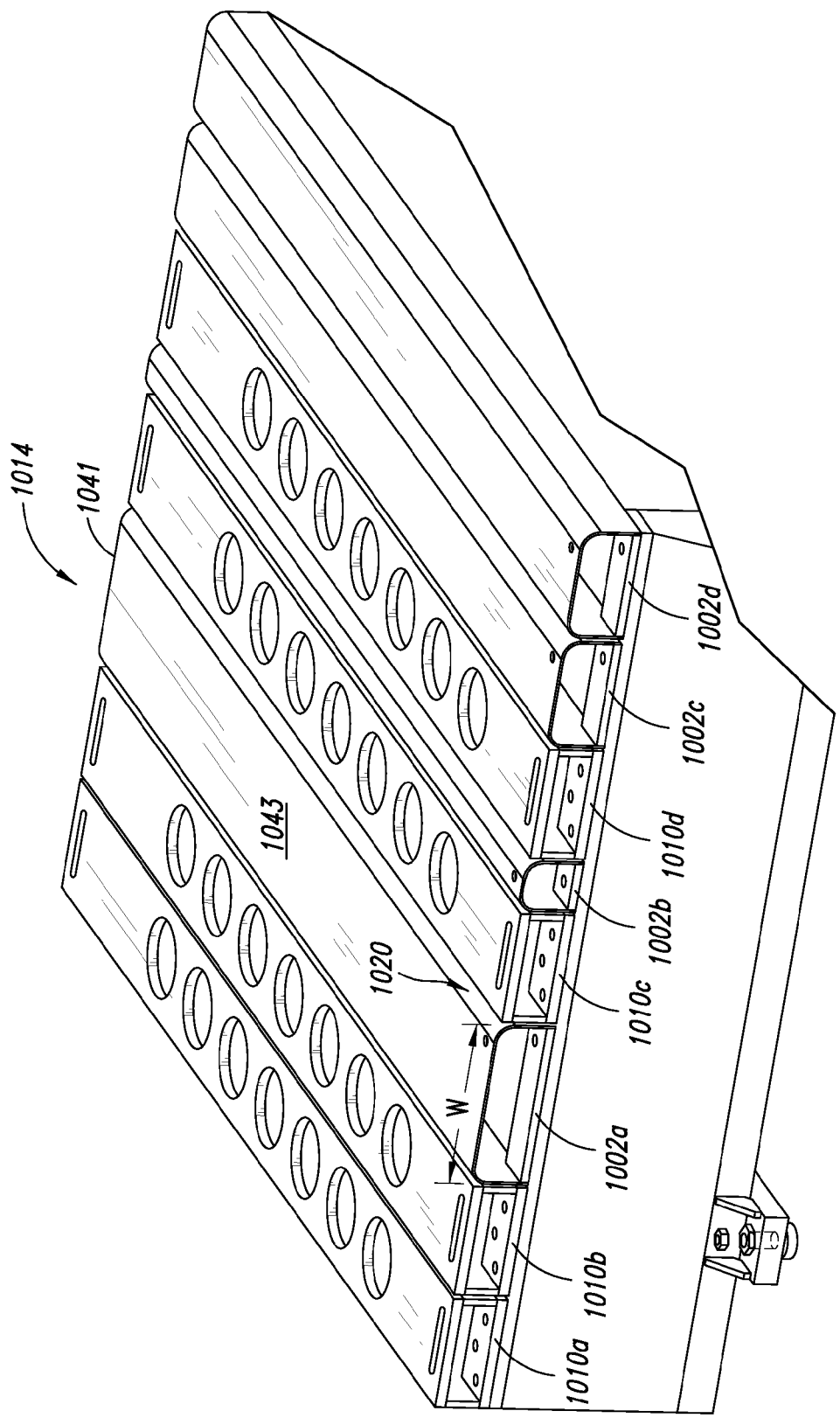
FIG. 13 is a pictorial view of closely arranged empty headers and covers.

FIG. 13 shows a positioning apparatus that includes covers 1002a-d (collectively 1002) and headers 1010a-d (collectively 1010), which are shown with actuators removed. At least some of the debris produced during processing can be kept from falling into the space beneath the closely arranged covers 1002 and headers 1010, thus minimizing, limiting, or substantially preventing the accumulation of debris underneath the positioning apparatus 1014. The covers 1002 (e.g., the covers 1002a, 1002c, 1002d) can be sufficiently wide to define walkways for walking across the positioning apparatus 1014. The cover 1002b can fill a relatively small gap between the header 1010c and the header 1010d.

Debris may include, without limitation, material removed from the workpiece (e.g., shavings, cut sections, etc.), materials used for producing a jet (e.g., water, abrasive material, or the like), or other unwanted or discarded materials produced as the workpiece is processed. Spaces, if any, between the covers 1002 and the headers 1010 can be relatively small such that debris accumulates on the covers 1002 and headers 1010. Water can flow along channels between adjacent components. For example, water can flow along a channel 1020 towards the sides of the positioning apparatus 1014 to help drain water. One or more sealing devices can be used to ensure that water drains primarily along the channels and are discussed in detail below.

Personnel can walk on the covers 1002 to gain access to workpieces or components of the positioning apparatus 1014, such as the actuators, even centrally located actuators, for actuator replacement, repair, inspection, or the like. The illustrated cover 1002a has a relatively wide support beam 1041 serving as a walkway. The beam 1041 is capable of supporting at least one person and defines a generally flat walking surface 1043. The covers 1002c, 1002d can also serve as walkways.

The dimensions of the covers 1002 can be selected based on the dimensions of gaps between the headers 1010. Each of the covers 1002 can fill most of or substantially all of a gap between an adjacent pair of the headers 1010. For example, the cover 1002a can extend across most of the distance separating the headers 1010b, 1010c. In some embodiments, the width W of the cover 1002a is at least 90% of the distance separating the headers 1010b, 1010c.

The covers 1002c, 1002d are dimensionally interchangeable with the headers 1010. As shown in FIG. 13, the covers 1002c, 1002d have widths generally equal to the headers 1010. The cover 1002b has a width that is about half of the width of the headers 1010. The cover 1002a has a width that is about two times or three times the width of the cover 1002b and 1.5 times the width of the covers 1002c, 1002d. Other widths are possible. Covers can have widths that are generally equal to or a multiple of half the width of the headers. In some arrangements, a plurality of covers 1002 are positioned between adjacent headers 1010.

The headers 1010 and covers 1002 can be rearranged any number of ways to provide a wide range of different configurations to provide a generally gapless upper surface. The covers 1002 can be supported by rails that also support the headers 1010. A user can conveniently access and position the ends of the covers 1002 and headers 1010 to reconfigure the processing apparatus 1014. In other embodiments, covers can be supported by headers or other suitable components of the processing apparatus 1014. For example, the covers can be supported by a pair of adjacent headers.

The support rails can be configured in such a way that mounting regions allow the headers 1010 to be arranged in a "half pitch" arrangement. If a group of headers are closely packed together (e.g., touching one another), a user can remove two adjacent headers and can install one header centrally in the gap where the two removed headers were located. Covers (e.g., covers similar to the cover 1002b of FIG. 13) can be installed in the resulting gap on either side of the header. Various covers and headers can be mixed and matched to provide closely stacked arrangements or headers that are spaced from one another.

Figure 14:
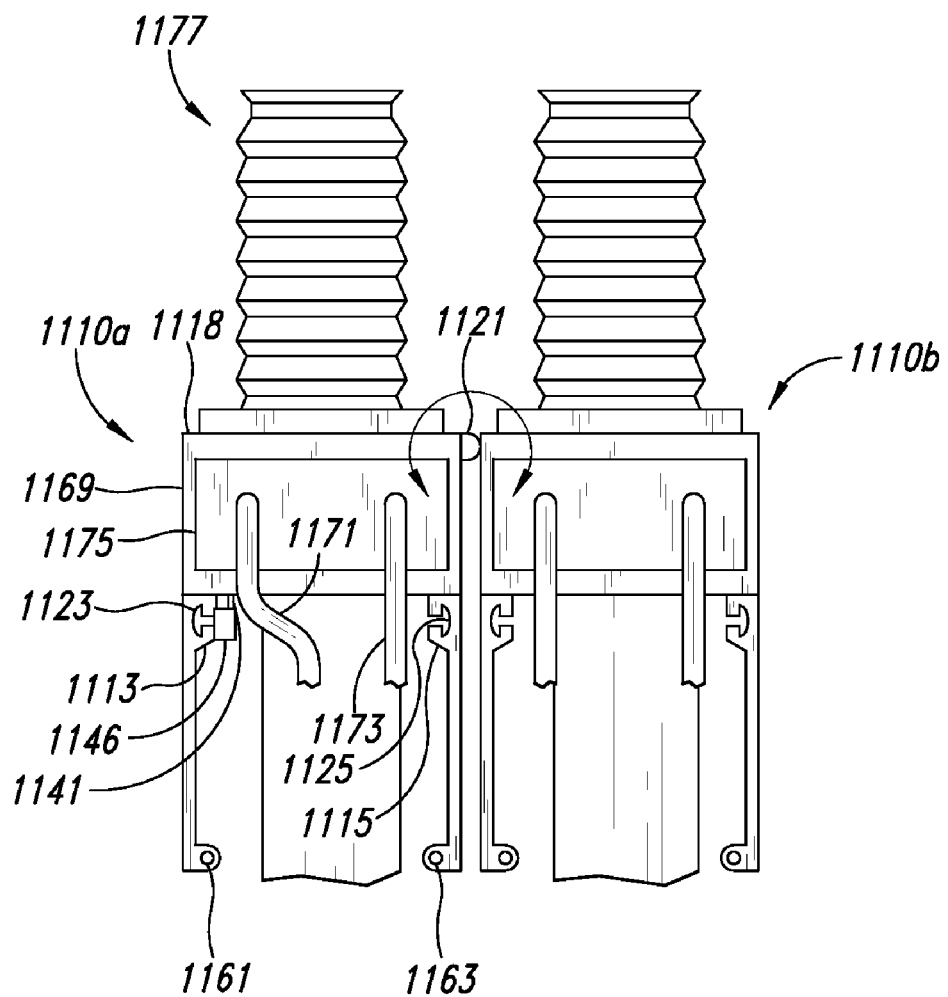
FIG. 14 is an elevational side view of two headers engaging one another.

The headers 1110 can include various features that facilitate assembly and/or improve operation, reliability, and/or performance. FIG. 14 shows the installed assembled header 1010a having mounting features 1113, 1115 with slots 1123, 1125 for retaining modular devices or tooling components, such as T-slot accessories. In some embodiments, components for conduit management (e.g., cable management, hose management, line management, or the like) are coupled to the mounting features 1113, 1115 to facilitate assembly and installation of actuators. These components can be clamps or other types of other types of restraining devices. Conduits can thus be kept away from the bottom of the actuators.

The header 1110a of FIG. 14 includes a base 1169, an end cap 1175, and hoses 1171, 1173 extending through the end cap 1175. The base 1169 includes a plurality of integral fluid passageways 1161, 1163. Pressurized fluid (e.g., air) or vacuums can be provided via the passageways 1161, 1163. In some embodiments, the passageways 1161, 1163 are used to pneumatically operate an actuator 1177. Pressurized fluid can be used to actuate the actuator 1177 while the vacuum is used by a holder of the actuator 1177. Because the passageways 1161, 1163 are integral to the base 1169, fluid communication can be reliably maintained with the actuator 1177 to minimize or avoids problems associated with separate pressurization/vacuum lines. In other embodiments, the header 1110*a* can have pressurization/vacuum lines that are separate from the base 1169 to allow convenient line replacement.

The illustrated headers 1110*a*, 1110*b* can be assembled and plumbed/wired to facilitate the addition or removal of actuators. Additionally, components may be protected or isolated to ensure reliable operation. For example, a hollow beam 1118 of the base 1169 can house connections, such as electrical connections, fluid connections (e.g., pneumatic connections), or the like. A wide range of different types of connections can be positioned along the interior of the hollow beam 1118. Actuators can be easily installed using these internal connections to minimize or limit machine downtime, thereby reducing machine downtime to increase production.

Figure 15:
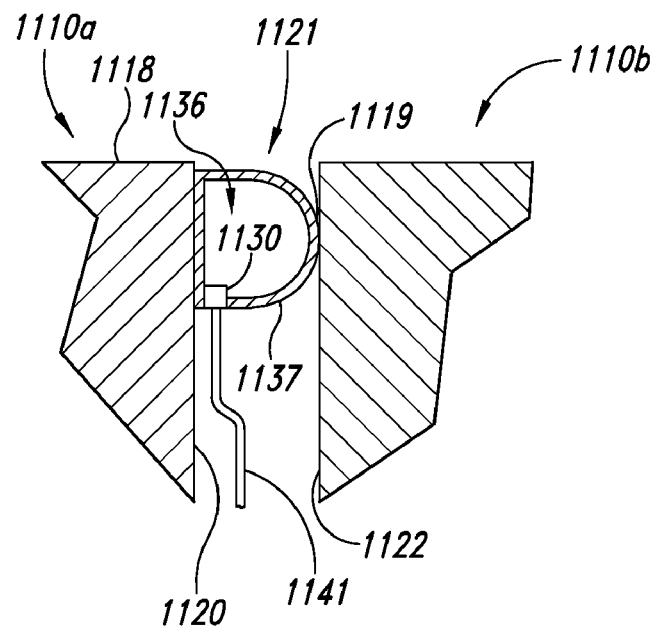
FIG. 15 is a detailed cross-sectional view of a sealing device of the header of FIG. 14.

A header and an adjacent component, such as a header or a cover, can shield the space beneath the actuators from byproducts produced during processing. FIGS. 14 and 15 show the headers 1110*a*, 1110*b* sealing engaging one another to prevent, limit, or substantially prevent material (e.g., water, debris, etc.) from falling between the headers 1110*a*, 1110*b*. The illustrated header 1110*a* includes a sealing device 1121 that contacts the header 1110*b* to form a seal.

Referring to FIG. 15, a seal 1119 is formed by pressing the sealing device 1121 against the header 1110*b*. The seal 1119 can be a fluid tight seal (e.g., a watertight seal), hermetic seal, or other type of seal. A desired seal can be obtained by varying the distance between a surface 1120 of the header 1110*a* and a surface 1122 of the header 1110*b*. If debris or water escapes past the seal 1119, the sealing device 1121 can be adjusted until the desired seal 1119 is achieved.

The sealing device 1121 can be fixedly coupled to the beam 1118 of the header 1110*a* via an adhesive (e.g., glues, bonding agents, or the like), one or more fasteners, or the like. The sealing device 1121 of FIG. 15 generally includes a sealing member 1137 (illustrated as a bladder seal), a chamber 1136 in the sealing member 1137, and an intake valve 1130 coupled to a fluid line 1141. The main body 1137 can be made, in whole or in part, of a compliant material that can assume different configurations. The compliant material can comprise foam, polymers, rubbers, combinations thereof, or the like.

The intake valve 1130 can be in communication one or more controllers or the switches that control the amount of fluid in the sealing member 1137. The chamber 1136 can be filled with fluid to achieve a desired level of inflation of the sealing member 1137. To inflate the sealing member 1137, a fluid source 1146 (shown in FIG. 14) can deliver fluid through the line 1141 and into the chamber 1136. In one embodiment, the fluid source 1146 can be an air pressurization device, such as an air compressor. The partially or fully inflated sealing member 1137 bears against the header 1110*b* so as to form the seal 1119, which can be maintained even if there is some movement between the headers 1110*a*, 1110*b*. After processing, the sealing member 1137 can be deflated by having fluid within the chamber 1136 pass through and out of the valve 1130, or another valve, such as an outlet valve. Thus, the sealing member 1137 can be inflated or deflated based on the position of the header 1110*a* and an adjacent component to provide interchangeability between headers and covers of different sized and/or tolerances.

Figure 16:
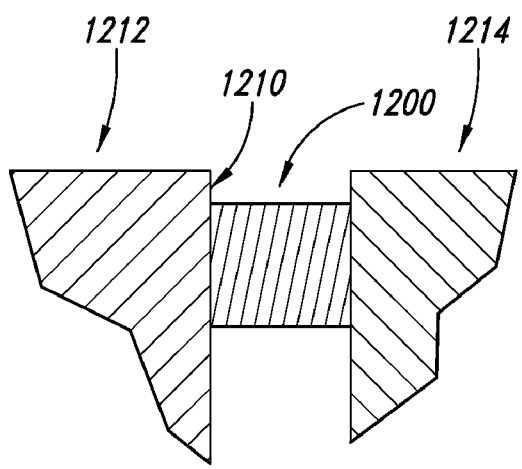
FIG. 16 is a detailed cross-sectional view of an alternative sealing device.

FIG. 16 shows a sealing device 1200 that is generally similar to the sealing device 1121 of FIG. 15, except as detailed further below. The sealing device 1200 has a generally solid cross-section (i.e., not hollow) and may be made, in whole or in part, of a compressible material, such as foam (e.g., a closed cell foam, open cell foam, or the like), capable of withstanding large deformations. The sealing device 1200 can be fixed to a surface 1210 of a header 1212 and can protrude towards an adjacent header 1214. In some embodiments, the sealing device 1200 is a monolithically formed sealing member.

Sealing members can have a one-piece or multi-piece construction and may have any suitable cross-sectional profile. For example, cross-sectional profiles of sealing members can be generally polygonal (e.g., rectangular or square), cylindrical, semicircular, or the like. The sealing member 1137 of FIG. 15 is generally semi-circular, and the sealing member 1200 of FIG. 16 is generally polygonal, illustrated as generally rectangular. Other cross-sectional profiles are also possible, if needed or desired. Sealing members can also have a generally constant cross-sectional profile along their longitudinal lengths. Such sealing members are especially well suited for use between generally parallel components. Alternatively, sealing members may have varying cross-sectional profiles along their longitudinal lengths for use between non-parallel components.

Figure 17:
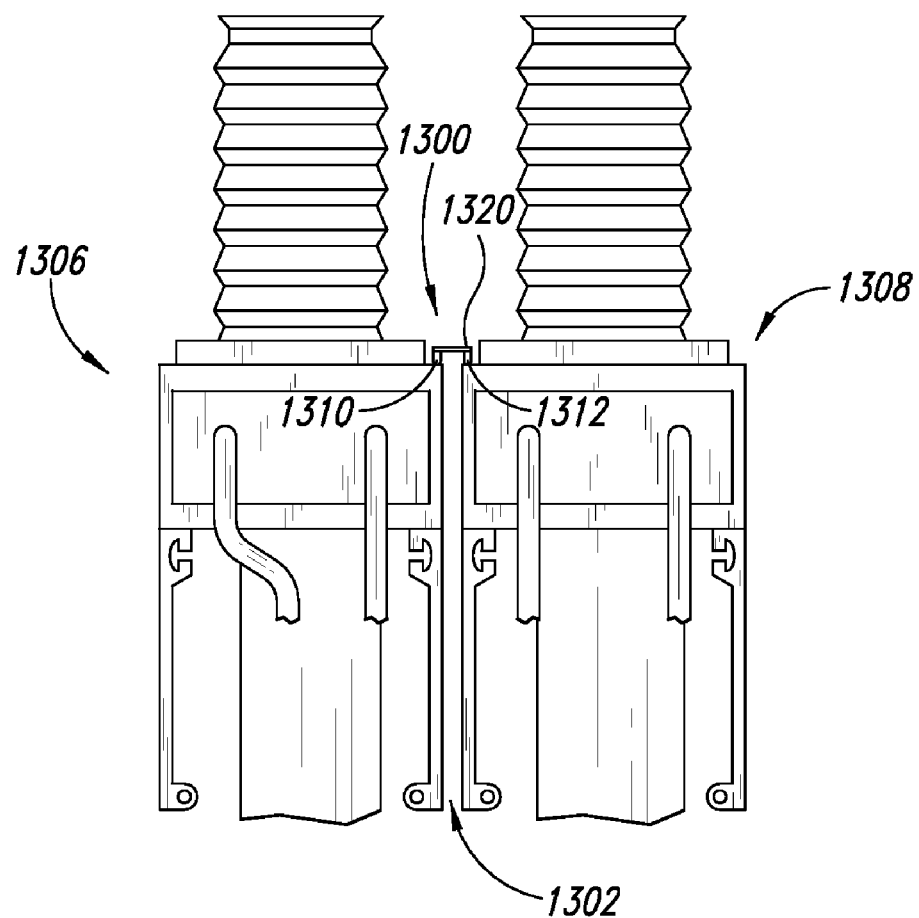
FIG. 17 is an elevational side view of two headers and a sealing device on the headers.
Figure 18:
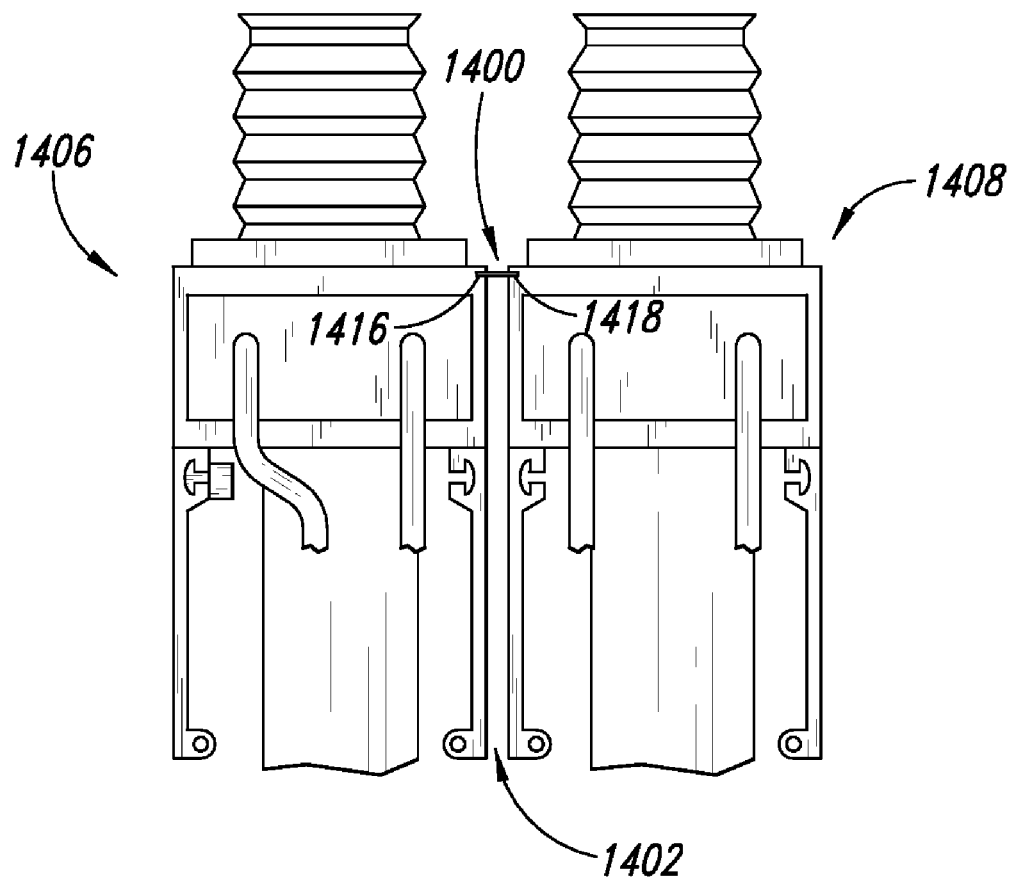
FIG. 18 is an elevational view of a sealing device between a pair of headers, in accordance with another embodiment.

FIGS. 17 and 18 show sealing devices that can be used with headers and/or covers. FIG. 17 shows a sealing device 1300 extending across a gap 1302 defined between headers 1306, 1308. The sealing device 1300 minimizes, limits, or substantially prevents debris from falling into the gap 1302 and generally includes a pair of engagement members 1310, 1312 and a main body 1320. The engagement members 1310, 1312 can sealingly engage the headers 1306, 1308, respectively. A user can conveniently lift the sealing device 1300 off of the headers 1306, 1308 to reposition or remove the sealing device 1300. In some embodiments, the sealing device 1300 is fixedly or rotatably coupled to one of the headers 1306, 1308.

Referring to FIG. 18, a sealing device 1400 extends between headers 1406, 1408. The sealing device 1400 can be embedded in the headers 1406, 1408 to shield the gap 1402. In the illustrated embodiment, the sealing device 1400 extends into slots 1416, 1418 of the headers 1406, 1408, respectively, and can be fixedly coupled to one of the headers 1406, 1408. If the sealing device 1400 is fixedly coupled to the header 1406, the sealing device 1400 can slide into the slot 1418 when the headers 1406, 1408 are move towards one another.

Figure 19:
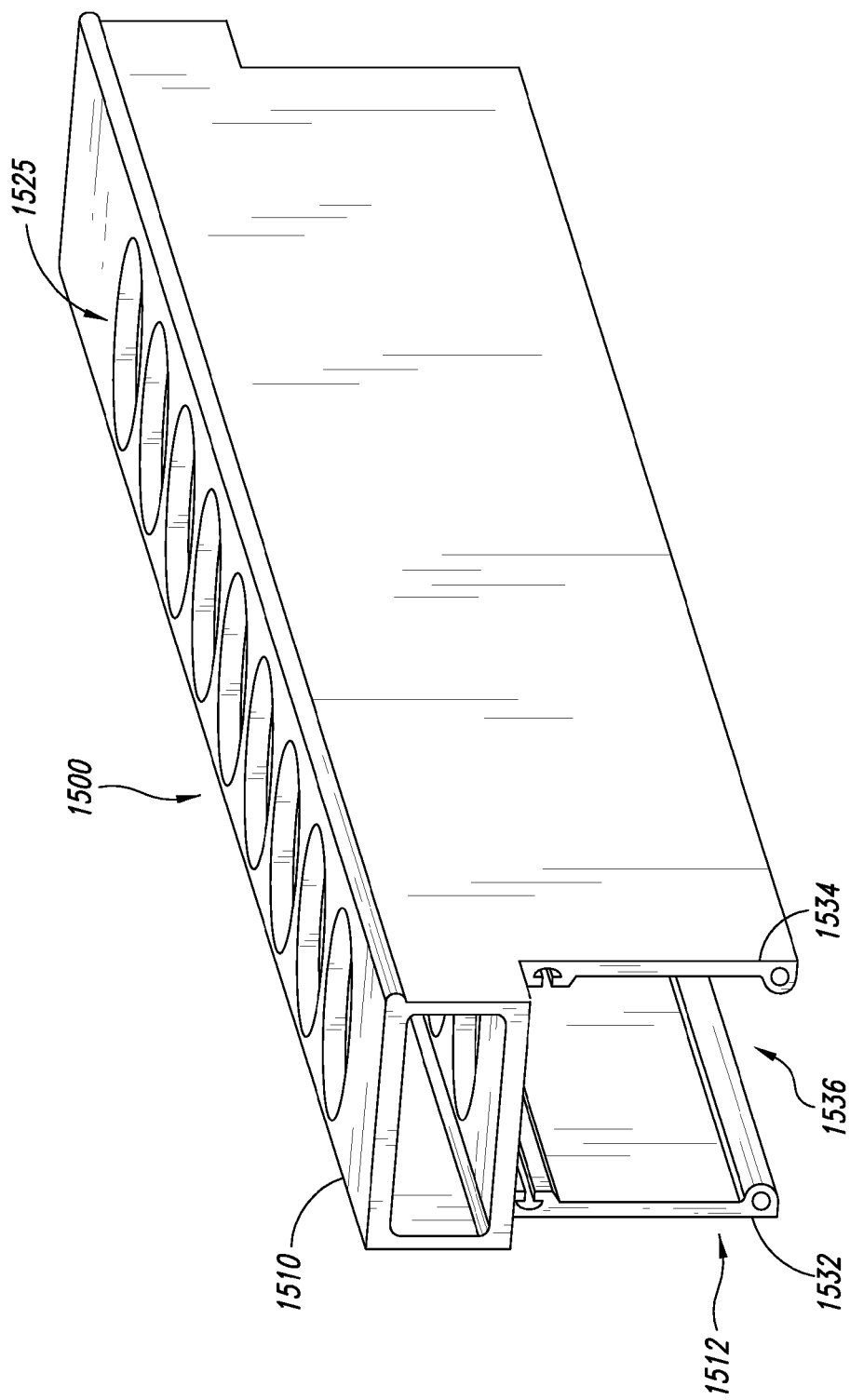
FIG. 19 is a pictorial view of a base of a header.

FIG. 19 shows a base 1500 including a hollow beam 1510 and skirt 1512 extending downwardly from the beam 1510. The beam 1510 includes a linear array of apertures 1525 for receiving actuators. The skirt 1512 includes a first portion 1532 spaced apart from a second portion 1534. The illustrated first and second portions 1532, 1534 are guards that define a space 1536. The first and second portions 1532, 1534 can thus protect the actuators and provide a space for receiving components, such as hoses, plumbing, or the like.

The base 1500 can be formed by different manufacturing processes, including processes involving extruding, molding, machining, milling, or the like. The illustrated based 1500 can be made of engineering materials, such as composites, polymers, metals (e.g., aluminum alloys, anodized aluminum, etc.), formed by an extrusion process. Passageways, mounting features, slots, portions of sealing devices, and the like may also be made during the extrusion process. The apertures 1525 can be formed via a drilling or milling process to produce a base with a one-piece construction. In other embodiments, the base 1500 can have multi-piece construction. For example, the beam 1510 can comprise a plurality of separate members coupled together by fasteners. In some embodiments, the base 1500 and/or beam 1510 can be a weldment. For example, portions of the base 1500 can be formed by an extrusion process and portions can be weldments assembled with the extruded portions.

The base 1500 may be made, in whole or in part, of one or more metals, composites, polymers, or combinations thereof. Composites may comprise without limitation, reinforcing elements (e.g., fibers, particles, and the like), fillers, binders, a matrix, or the like. Metal, wood, fiberglass, polymers, plastics, metals, ceramics, glass, or the like can be combined together to produce the beams with properties that are different from the properties of its constituents individually. In some embodiments, the base 1500 can comprise a fiber-reinforced composite, particle-reinforced composite, laminates (e.g., a stack of laminas assembled together), or combinations thereof. The matrix of the composites can be made of metal, polymers, or other suitable materials for encapsulating other reinforcement components, such as fiber. The laminates can be unidirectional laminates, cross-ply laminates, angle-ply laminates, symmetric laminates, or the like. Composite bases 1500 can include non-composite features (e.g., embedded metal mounting features) or the like. In some embodiments, the base 1500 is made mostly of a fiber-reinforced composite. Metal components can be embedded in the composite material, if needed or desired.

To reduce manufacturing costs, both headers and covers can be made of or incorporate the same components. Some of the bases can be used as debris covers without substantial alterations, and other bases can be further processes to form the apertures 1525 or other features to produce headers. For example, a cover can be made of the base 1500 of FIG. 19 without the apertures 1525. Manufacturing costs and complexity can thus be reduced by using the same components for major components of the positioning apparatuses.

Various methods and techniques described above provide a number of ways to carry out the disclosed embodiments. Furthermore, the skilled artisan will recognize the interchangeability of various features, such as rails and headers, from different embodiments disclosed herein. Similarly, the various features and acts discussed above, as well as other known equivalents for each such feature or act, can be mixed and matched by one of ordinary skill in this art to perform methods in accordance with principles described herein. For example, the positioning apparatus disclosed herein can be used with a wide range of manufacturing systems, such as machine tools, milling machines, drill presses, measuring machines (e.g., coordinate measuring machines), non-destructive testing machines, assembly systems, and the like. Additionally, the methods which are described and illustrated herein are not limited to the exact sequence of acts described, nor are they necessarily limited to the practice of all of the acts set forth. Other sequences of events or acts, or less than all of the events, or simultaneous occurrence of the events, may be utilized in practicing the disclosed embodiments.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, it is not intended that the invention be limited, except as by the appended claims.

What is claimed is:

1. A system for supporting a workpiece, comprising:
   a first support rail having a plurality of discrete first mounting regions;
   a second support rail having a plurality of discrete second mounting regions, the second mounting regions and corresponding first mounting regions defining a plurality of transverse mounting positions;
   a receiving window between the first support rail and the second support rail;
   a header dimensioned to rest on the first support rail and the second support rail and to support at least a portion of a workpiece, the header comprising:
      a beam,
      a panel of actuators fixedly coupled to the beam such that free ends of the actuators are movable away from and towards the beam, and
      a first locking mechanism at a first end of the header and a second locking mechanism at a second end of the header opposing the first end, the first and second locking mechanisms coupleable to a pair of the first and second mounting regions to keep the header at one of the transverse mounting positions when the first and second locking mechanisms are in locked configurations, the header being movable with respect to the first support rail and the second support rail when the first locking mechanism and the second locking mechanism are in unlocked configurations; and
   at least one cover supported by the first support rail and the second support rail to fill substantially all of a gap between an adjacent pair of the headers.

2. The system of claim 1, wherein the header is adapted to be lifted vertically away from the first support rail and the second support rail when the first and second locking mechanisms are in the unlocked configurations.

3. The system of claim 1, wherein the panel of actuators extends through the beam.

4. The system of claim 1, wherein the panel of actuators is substantially perpendicular to at least one of a longitudinal axis of the first support rail and a longitudinal axis of the second support rail.

5. The system of claim 1, wherein each of the actuators is independently movable along respective lines of action extending through the receiving window.

6. The system of claim 1, wherein the header includes at least one stationary holder that cooperates with the panel of actuators to support the workpiece or couple to a tool.

7. The system of claim 6, wherein the at least one stationary holder is an elongate rod or an arch with a platform.

8. The system of claim 1, wherein at least one of the first and second locking mechanisms includes a locating pin configured to pass through one of the first and second mounting regions.

9. The system of claim 1, wherein the beam has an axial length sufficiently long such that the first end and the second end of the beam overlay the first support rail and the second support rail, respectively.

10. The system of claim 1, wherein the first mounting regions are formed in an upper surface of the first support rail and the second mounting regions are formed in an upper surface of the second support rail.

11. The system of claim 1, further comprising:
   a plurality of headers adapted to be positioned at corresponding transverse mounting positions and dimensioned to rest on the first support rail and the second support rail.

12. The system of claim 1, wherein at least one of the actuators is movable between laterally offset positions with respect to a longitudinal axis of the beam.

13. The system of claim 1, wherein at least one of the actuators has a mounting plate adapted to mate with a mounting region of the beam to define a plurality of preset actuator mounting positions.

14. A system for supporting a workpiece, comprising:
a first support rail having a plurality of discrete first mounting regions;
a second support rail having a plurality of discrete second mounting regions, the second mounting regions and corresponding first mounting regions defining a plurality of transverse mounting positions;
a receiving window between the first support rail and the second support rail; and
a header dimensioned to rest on the first support rail and the second support rail and to support at least a portion of a workpiece, the header comprising:
a beam,
a panel of actuators fixedly coupled to the beam such that free ends of the actuators are movable away from and towards the beam,
a first locking mechanism at a first end of the header and a second locking mechanism at a second end of the header opposing the first end, the first and second locking mechanisms coupleable to a pair of the first and second mounting regions to keep the header at one of the transverse mounting positions when the first and second locking mechanisms are in locked configurations, the header being movable with respect to the first support rail and the second support rail when the first locking mechanism and the second locking mechanism are in unlocked configurations, and
a sealing device configured to form a seal with another component movable with respect to the header.

15. The system of claim 14, wherein the sealing device is an inflatable bladder seal extending lengthwise along the beam.

16. A manufacturing system for processing a workpiece, the system comprising:
a stationary frame having a first support rail and a second support rail, the first support rail including a plurality of spaced apart discrete first mounting regions formed therein, the second support rail including a plurality of spaced apart discrete second mounting regions formed therein, and corresponding transverse pairs of the first mounting regions and second mounting regions defining installation positions;
a plurality of headers positionable at respective ones of the installation positions, each of the headers including a row of movable actuators adapted to support at least a portion of a workpiece processed by a machining system; and
at least one cover supported by the first support rail and the second support rail to fill substantially all of a gap between an adjacent pair of the headers.

17. The manufacturing system of claim 16, wherein each of the headers is configured to be fixedly coupled to a corresponding pair of the first and second mounting regions.

18. The manufacturing system of claim 16, wherein at least one of the headers includes a beam that extends transversely between and rests upon the first support rail and the second support rail.

19. The manufacturing system of claim 16, wherein each header includes a locking mechanism having a locked state for fixedly coupling to the frame and an unlocked state for moving with respect to the frame.

20. The manufacturing system of claim 16, wherein at least one of the headers has a beam and an actuator mountable at a plurality of preset mounting positions with respect to the beam, the preset mounting positions between adjacent headers.

21. The manufacturing system of claim 16, wherein at least one of the headers has an elongate member and an actuator that includes a mounting plate adapted to mate with a mounting region of the elongate member to define a plurality of preset actuator mounting positions.

22. The manufacturing system of claim 16, wherein the at least one cover is sufficiently wide to define a walkway.

23. The manufacturing system of claim 16, comprising a plurality of covers each having a width that is generally equal to or a multiple of half a width of one of the headers.

24. A manufacturing system for processing a workpiece, the system comprising:
a stationary frame having a first support rail and a second support rail, the first support rail including a plurality of spaced apart discrete first mounting regions formed therein, the second support rail including a plurality of spaced apart discrete second mounting regions formed therein, and corresponding transverse pairs of the first mounting regions and second mounting regions defining installation positions;
a plurality of headers positionable at respective ones of the installation positions, each of the headers including a row of movable actuators adapted to support at least a portion of a workpiece processed by a machining system; and
a cover between an adjacent pair of components to shield a space generally beneath the adjacent components from water and debris as a workpiece is processed.

25. The manufacturing system of claim 24, wherein the cover forms a fluid tight seal with at least one of the adjacent components that is in the form of a header.

26. A manufacturing system for processing a workpiece, the system comprising:
a stationary frame having a first support rail and a second support rail, the first support rail including a plurality of spaced apart discrete first mounting regions formed therein, the second support rail including a plurality of spaced apart discrete second mounting regions formed therein, and corresponding transverse pairs of the first mounting regions and second mounting regions defining installation positions; and
a plurality of headers positionable at respective ones of the installation positions, each of the headers including a row of movable actuators adapted to support at least a portion of a workpiece processed by a machining system, the plurality of headers being connected to one another to form fluid tight seals between one another.

27. The manufacturing system of claim 16, wherein one of the headers includes an inflatable sealing device adapted to engage an adjacent header or cover.

28. A system for positioning a workpiece, the system comprising:
a first support rail;
a second support rail spaced apart from the first support rail, the first support rail and the second support rail defining a plurality of discrete mounting positions located along longitudinal lengths of the first support rail and the second support rail; and
a plurality of elongate upright headers independently movable along the lengths of the first support rail and the second support rail and fixedly coupleable to the first support rail and the second support rail at respective ones of the discrete mounting positions, each of the headers adapted to rest on the first support rail and the second support rail; and at least one cover supported by the first support rail and the second support rail to fill substantially all of a gap between an adjacent pair of the headers.

29. The system of claim 28, wherein at least one of the headers includes a locking mechanism having a locked configuration for fixedly coupling to one of the first and second support rails and an unlocked configuration for allowing the header to move with respect to the one of the first and second support rails.

30. The system of claim 28, wherein one of the headers has a panel of actuators with a fixed length, each of the actuators has a raised configuration and a lowered configuration to adjust a height of the panel of actuators.

31. The system of claim 28, wherein at least one of the headers has a plurality of actuators, and top surfaces of the first and second support rails are positioned vertically midway along the plurality of actuators.

32. The system of claim 28, wherein at least one of the headers has at least one upright movable actuator and at least one fixed height support component that cooperates with the at least one upright movable actuator to support the workpiece.

33. The system of claim 28, wherein the plurality of elongate upright headers are horizontally stackable along the first and second support rails.

34. A method of processing a workpiece using the manufacturing system of claim 16, the method comprising:

positioning the plurality of headers on the plurality of first mounting regions of the first support rail and the plurality of second mounting regions of the second support rail such that the plurality of headers extend transversely between the first support rail and the second support rail;

fixedly coupling the headers to the first and second support rails using locking mechanisms of the headers such that each locking mechanism is received by one of the first and second mounting regions;

positioning the cover between the adjacent pair of headers to fill substantially all of the gap therebetween;

placing a workpiece on the actuators of the headers;

processing the workpiece using a movable machining assembly;

removing the processed workpiece from the actuators; and decoupling one of the headers from the first and second support rails using the locking mechanisms.

35. The method of claim 34, further comprising:

moving at least one of the headers with respect to the first and second support rails after decoupling the header from the first and second support rails.

36. The method of claim 34, wherein positioning the plurality of headers further comprises horizontally stacking the plurality of headers along the first and second support rails.

37. The method of claim 34, wherein placing the workpiece on the actuators further includes positioning the workpiece on panels formed of rows of the actuators.

38. The method of claim 34, further comprising:

eccentrically positioning at least one of the actuators with respect to a beam of one of the headers supporting the at least one actuator.

39. The method of claim 34, further comprising:

moving one of the actuators from a first mounting position to a second mounting position while the actuator extends through a beam of the header that supports the actuator in the first and second mounting positions.

40. The method of claim 34, further comprising:

engaging at least one pair of adjacent headers to produce a water and/or debris resistant barrier.

41. The method of claim 40, further comprising:

compressing a sealing device between the at least one pair of adjacent headers.

* * * * *